(12) United States Patent
Ido et al.

(10) Patent No.: US 8,630,533 B2
(45) Date of Patent: Jan. 14, 2014

(54) EDITING APPARATUS, EDITING METHOD AND PROGRAM

(75) Inventors: Kazuo Ido, Kanagawa (JP); Naohiro Kanamori, Kanagawa (JP); Tetsuya Makabe, Kanagawa (JP); Norio Wakatsuki, Kanagawa (JP); Tadashi Fujiwara, Kanagawa (JP); Shinpei Ikegami, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 12/837,566

(22) Filed: Jul. 16, 2010

(65) Prior Publication Data

US 2011/0019973 A1 Jan. 27, 2011

(30) Foreign Application Priority Data

Jul. 23, 2009 (JP) ................. P2009-172459

(51) Int. Cl.
*H04N 5/93* (2006.01)
(52) U.S. Cl.
USPC ........................................... 386/283
(58) Field of Classification Search
None
See application file for complete search history.

(56) References Cited

U.S. PATENT DOCUMENTS

| 6,507,697 B1* | 1/2003 | Fujita et al. ............ 386/241 |
| 7,421,189 B2 | 9/2008 | Ido et al. |
| 2005/0244138 A1* | 11/2005 | O'Connor et al. ......... 386/94 |
| 2007/0091378 A1* | 4/2007 | Ren .................. 358/426.13 |
| 2007/0177850 A1* | 8/2007 | Yamauchi ............... 386/96 |

FOREIGN PATENT DOCUMENTS

WO WO 99 22374 5/1999

* cited by examiner

*Primary Examiner* — Sath V Perungavoor
*Assistant Examiner* — Kate Luo
(74) *Attorney, Agent, or Firm* — Frommer Lawrence & Haug LLP; William S. Frommer

(57) ABSTRACT

In an editing apparatus; overwriting data used for insertion editing on base data, which is segmented into each picture including data having a predetermined unit of data amount X, and includes variable-length encoded real data, is variable-length encoded; each picture is sequentially obtained as a target picture, and regarding the target picture, if an amount of the overwriting data is equal to X, the overwriting data is handled as insertion data as it is, otherwise, insertion data is created by adding stuffing data to the overwriting data so that the amount of the overwriting data can be equal to X; a filler having the same amount as a filler of the base data is added to the insertion data having the same total amount as the real data; and the resultant insertion data is added onto the base data.

13 Claims, 27 Drawing Sheets

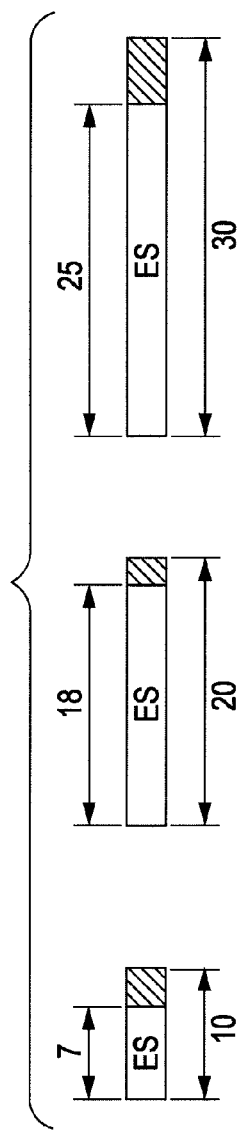
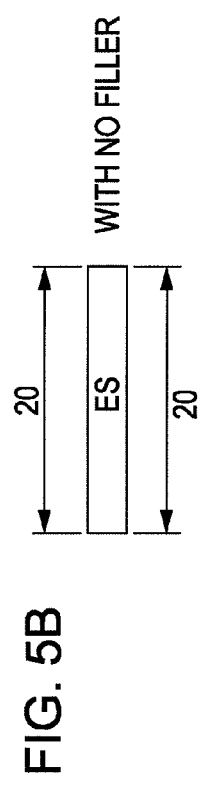
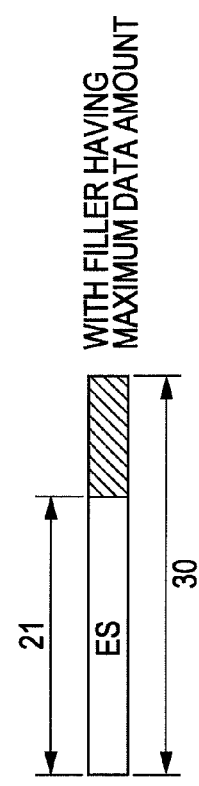
FIG. 5A
FIG. 5B WITH NO FILLER
FIG. 5C WITH FILLER HAVING MAXIMUM DATA AMOUNT

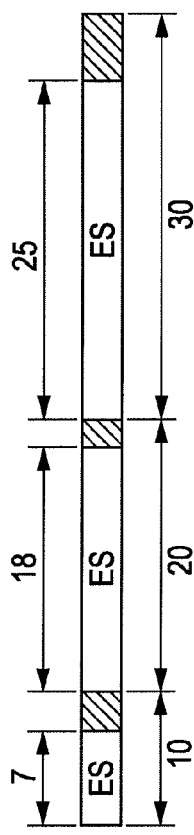
FIG. 6A  BASE DATA
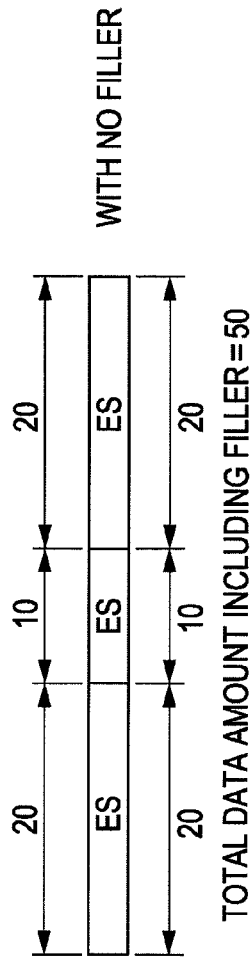
FIG. 6B  EDIT DATA
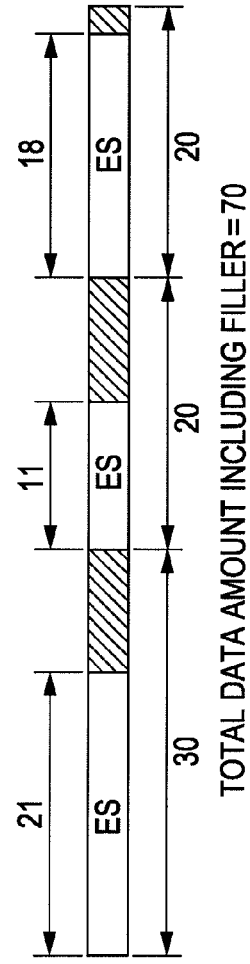
FIG. 6C  EDIT DATA

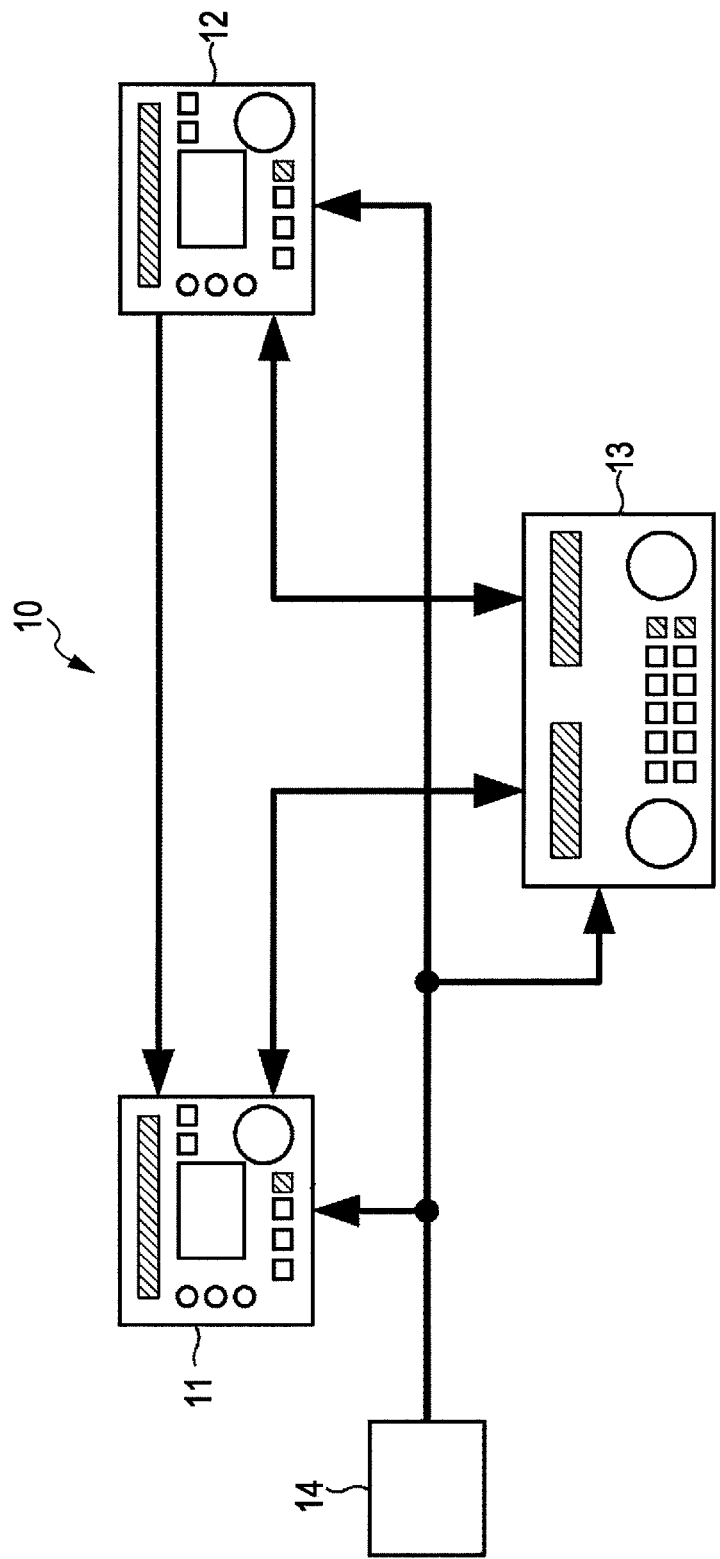

BASE DATA

INSERTION DATA

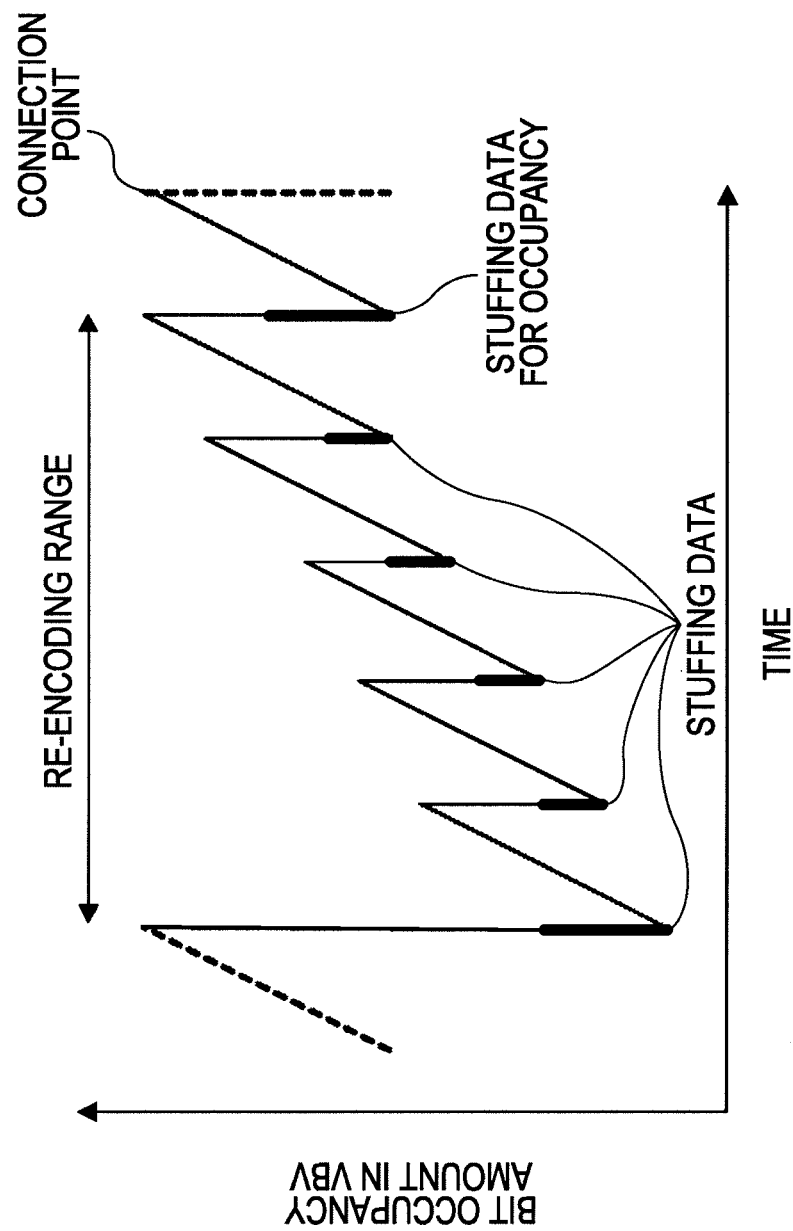

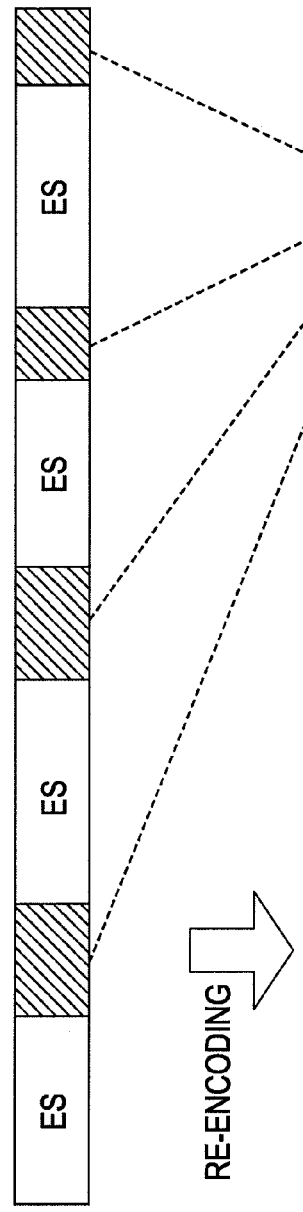
FIG. 13A BASE DATA
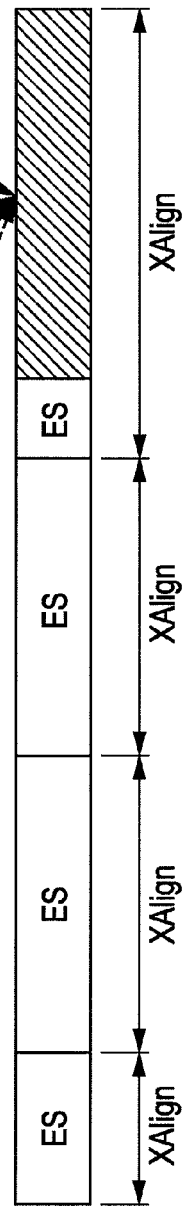
FIG. 13B RECORD DATA

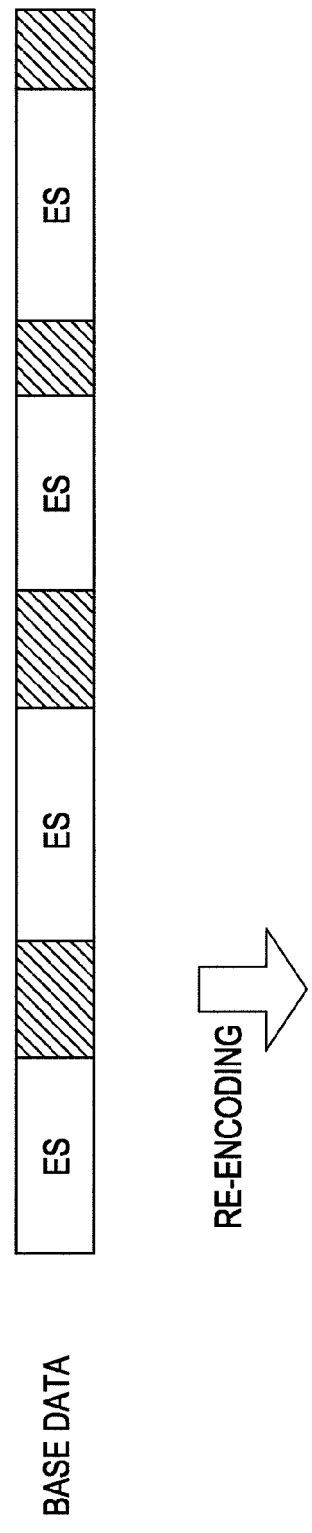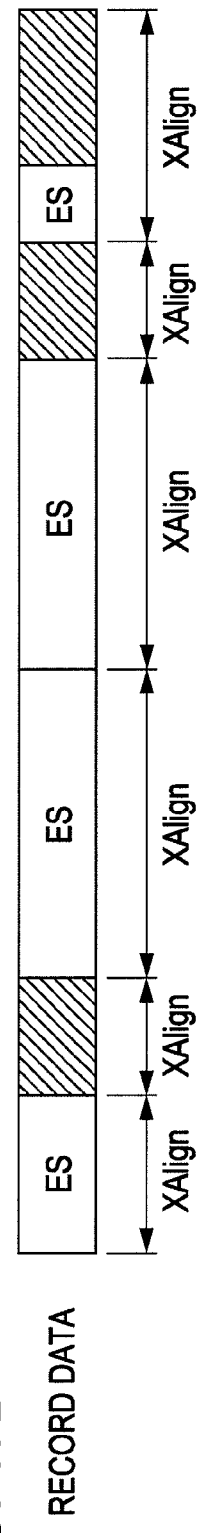
FIG. 17A BASE DATA
FIG. 17B RECORD DATA

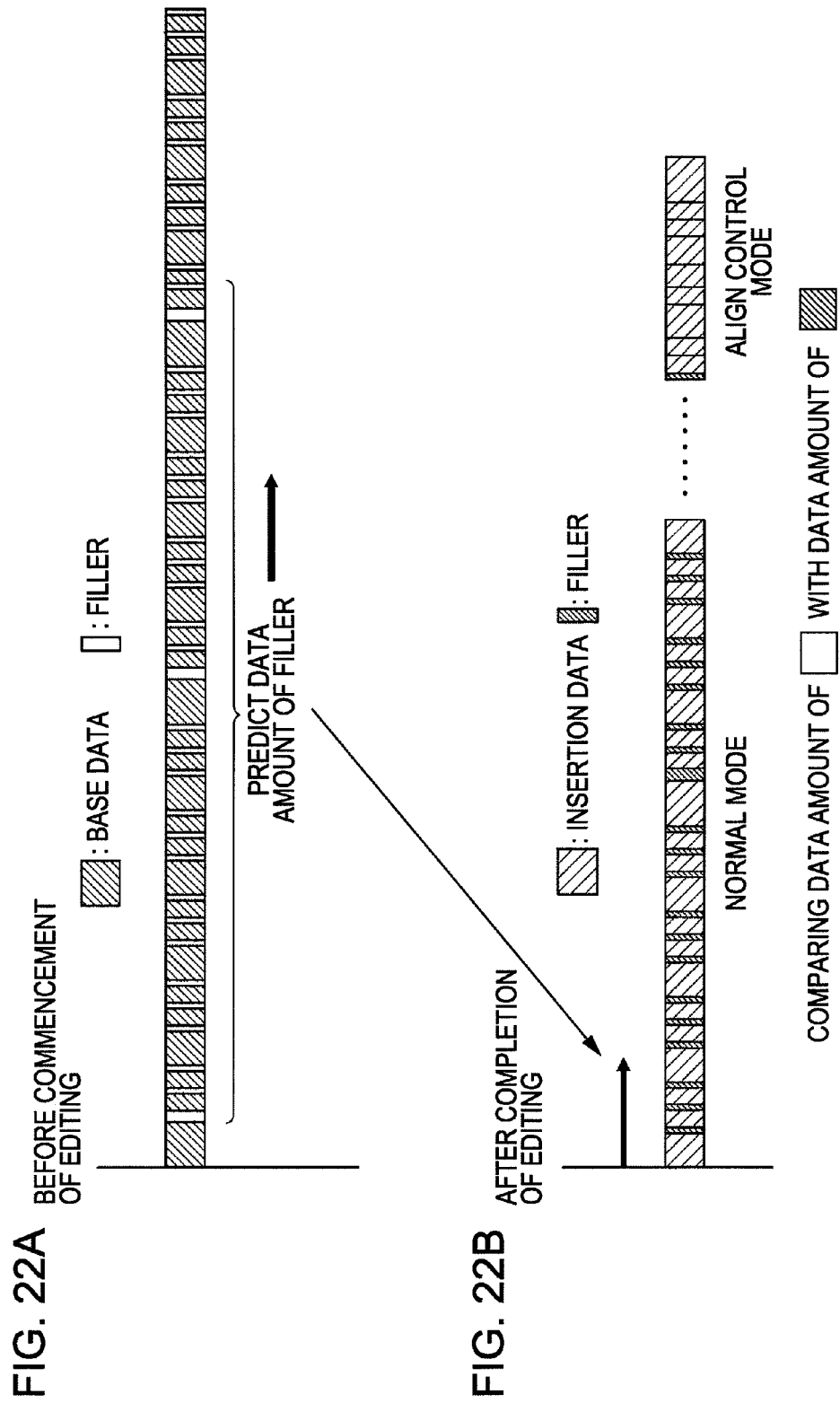

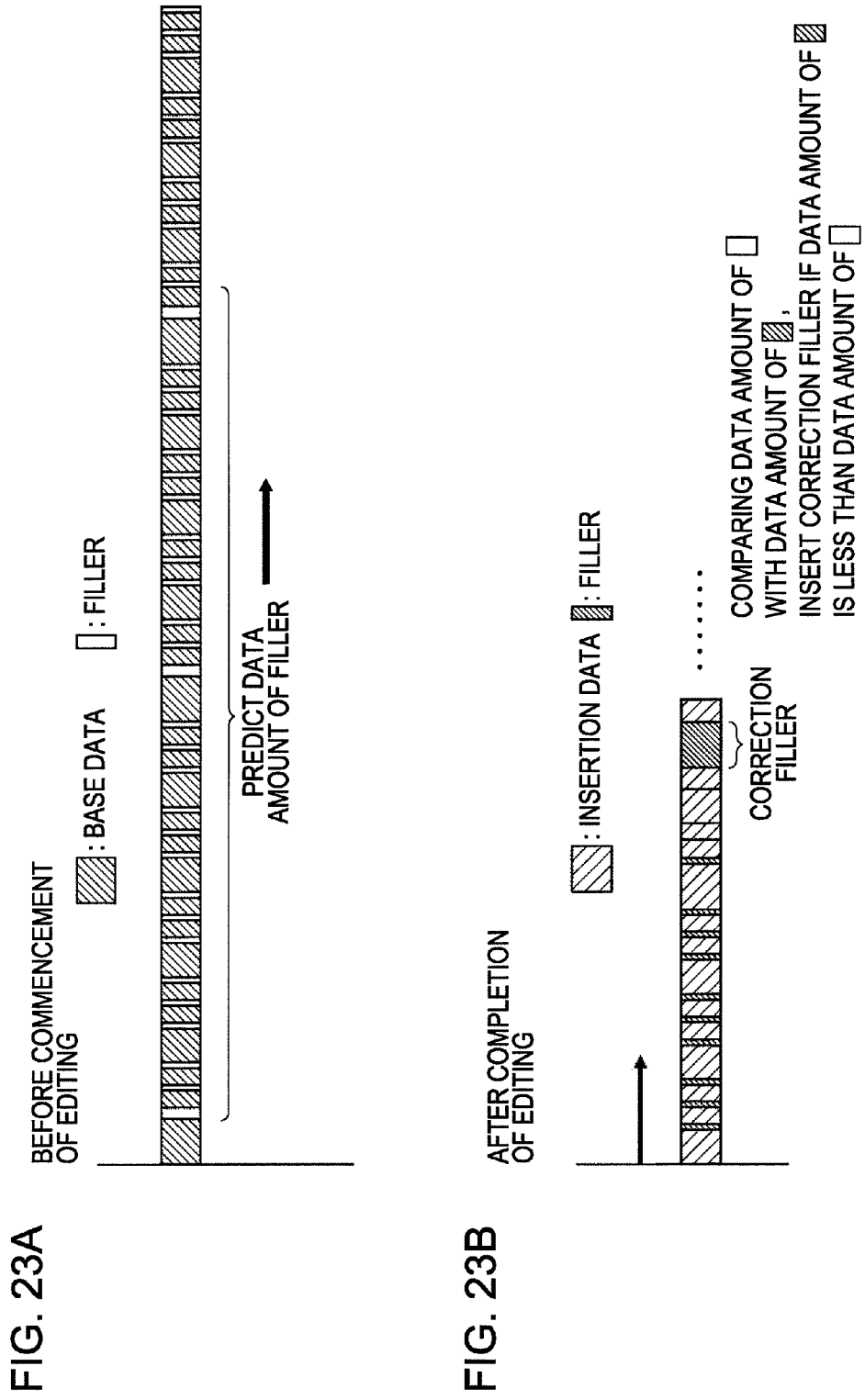

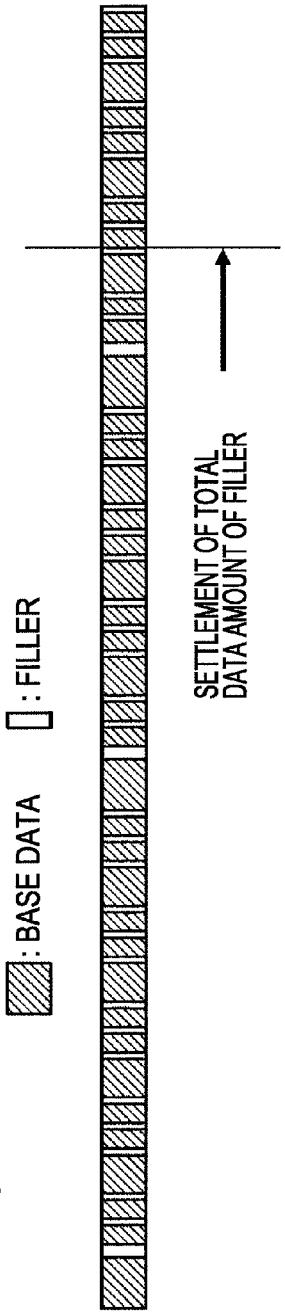
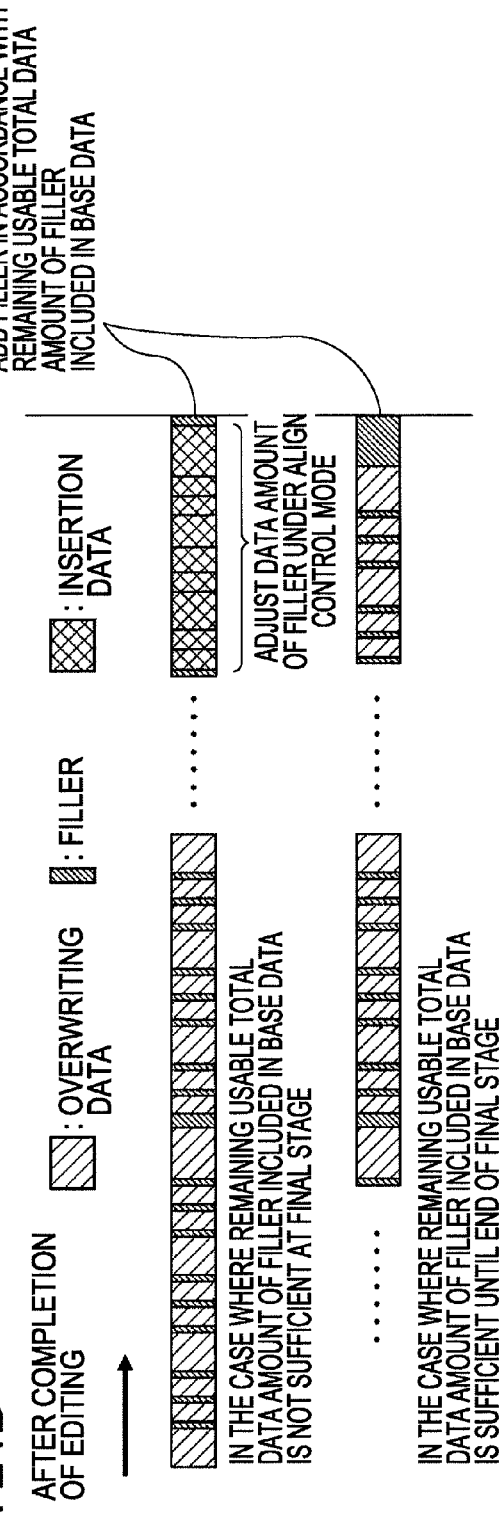

EDITING APPARATUS, EDITING METHOD AND PROGRAM

BACKGROUND OF THE INVENTION

1. Field of the Invention

The present invention relates to editing apparatuses, editing methods and programs, and in particular, it relates to an editing apparatus, an editing method and a program, which enable insertion editing of variable-length encoded data with certainty.

2. Description of the Related Art

Recently, in existing video tape recorders (VTRs), insertion editing technologies, which enable insertion of edit data onto a predetermined range including data that is already recorded in video tapes (hereinafter, the data that is already recorded will be called base data), have been generally and widely used (for example, refer to International Publication Pamphlet No. WO99/22374).

Further, in addition thereto, in editing systems allowing editing of data recorded in recording media, which is variable-length encoded by using a moving picture experts group phase (MPEG) method supporting the Long-GOP structure, insertion editing functions using technologies just like the existing ones have been desired.

FIGS. 1A and 1B are diagrams used for explanation of an insertion editing method in the case where base data and edit data are fixed-length encoded data.

In an example shown in FIGS. 1A and 1B, base data and edit data are each recorded iteratively for each frame of annual ring data including three kinds of data aligned within a period of time of two seconds, a first one being proxy data (PROXY) or real-time meta data (RT), a second one being audio data (AUDIO), a third one being video data (VIDEO). In addition, the proxy data is proxy data obtained by downsizing the video data, and the real-time meta data is meta data having contents therein, for which, when read-out processing thereon is performed, the real-time characteristics of the read-out processing is to be ensured.

As shown in FIG. 1A, if base data is fixed-length encoded data, each block of data forming a frame of annual ring data has a fixed length. Further, if edit data is fixed-length encoded data, a data amount of base data within a predetermined period of time while reproduction thereof is performed is the same as a data amount of edit data within the same predetermined period of time while reproduction thereof is performed. Accordingly, for example, as shown in FIG. 1B, it is possible to perform insertion editing by replacing video data included in base data within a predetermined period of time while reproduction of the base data is performed, by video data included in edit data within the same predetermined period of time while reproduction of the edit data is performed.

In contrast, an insertion editing performed in the case where video data included in base data and video data included in edit data are variable-length encoded data will be hereinafter described with reference to FIGS. 2A and 2B.

As shown in FIGS. 2A and 2B, if video data included in base data and video data included in edit data are variable-length encoded data, a total generated code amount of video data included in base data within a predetermined period of time while reproduction of the base data is performed, as well as a total generated code amount of video data included in edit data within the same predetermined period of time while reproduction of the edit data is performed, is variable. Therefore, the total generated code amount of video data included in edit data within a predetermined period of time while reproduction of the edit data is performed is likely to be larger than the total generated code amount of video data included in base data within the same predetermined period of time while reproduction of the base data is performed. In such a case, performing overwriting of video data, which is included in edit data within a predetermined period of time, on video data, which is included in base data within the same predetermined period of time, is difficult, and thus, makes it difficult to perform insertion editing.

Accordingly, as shown in FIG. 3, a method, which enables base data and edit data to be variable-length encoded so that a total generated code amount of an ES for base data and a total generated code amount of an ES for edit data can be the same, has been considered.

However, recording units of data to be recorded into recording media have fixed lengths, and such a recording unit is determined in advance in accordance with a file format in which data is recorded.

For example, a file format in accordance with the material exchange format (MXF) is configured to include a header, a body and a footer, which are serially allocated from the beginning thereof. The body is configured by items each forming one frame.

More specifically, as shown in FIG. 4, the body is configured to have three kinds of items, a first one being a system item including meta data allocated therein, which is associated with a frame of video data allocated in a picture item subsequent to the system item itself, a second one being a picture item including a frame of video data allocated therein, which is encoded by using an MPEG method supporting the Long-GOP structure, a third one being an audio item including a frame of audio data allocated therein, which is encoded by using a method conforming to the audio engineering society (AES) 3 standard.

Further, as shown in FIG. 4, in each of the items, data is KLV (Key, Length, and Value) coded, and is allocated so as to form a KLV structure.

The KLV structure is a data structure, in which, from the beginning thereof, Key, Length and Value are serially allocated. Key has a label of 16 bytes allocated therein, which conforms to the standard SMPTE 298M, and represents a kind of a block of data included in Value. Length has a data length of the block of data included in Value. Value has a block of real data allocated therein.

Further, each of the items has a fixed data-length based on the KLV alignment grid (KAG). Further, a filler ("FILL" shown in FIG. 4), which allows each of the items to have a fixed data-length, is also configured to form the KLV structure, and is allocated so as to follow a data portion of each of the items.

As described above, in the MXF, data is recorded individually for each of recording units corresponding to respective fixed data-lengths of the three kinds of items. The recording unit corresponding to the picture item is, for example, 2 Kbytes.

SUMMARY OF THE INVENTION

Therefore, even if a total generated code amount of an ES for base data and a total generated code amount of an ES for edit data are the same, a data amount of edit data to be actually inserted is likely to be larger than a data amount of base data, onto which the edit data is to be inserted.

For example, in the case where a recording unit of data is 10 bytes, as shown in a left portion of FIG. 5A, if a total generated code amount of an ES is 7 bytes, a filler having 3 bytes in length is added thereto, so that the resultant data having 10 bytes in length is recorded. Further, as shown in a middle portion of FIG. 5A, if a total generated code amount of an ES is 18 bytes, a filler having 2 bytes in length is added thereto, so that the resultant data having 20 bytes in length is recorded separately for each data having 10 bytes in length. Further, as shown in a right portion of FIG. 5A, if a total generated code amount of an ES is 25 bytes, a filler having 5 bytes in length is added thereto, so that the resultant data having 30 bytes in length is recorded separately for each data having 10 bytes in length.

Namely, a data amount of a filler is 0 byte at a minimum, such as shown in of FIG. 5B, and is 9 bytes at a maximum, such as shown in FIG. 5C.

Further, as shown in FIG. 6A, in the case where a total generated code amount of an ES for base data, the ES being separately allocated to three pictures, is 50 bytes, and generated code amounts of portions of the ES allocated to the three pictures, are 7 bytes, 18 bytes and 25 bytes, respectively, the total data amount of base data including fillers, which is in an actually recorded condition, is 60 bytes.

Under such a condition, as shown in FIG. 6B, even in the case where a total generated code amount of an ES for edit data, the ES being separately allocated to three pictures, is 50 bytes, if generated code amounts of portions of the ES included in the three pictures are 20 bytes, 10 bytes and 20 bytes, respectively, no filler is added to the portions of the ES allocated to the three pictures, and as a result, the total data amount of edit data including fillers, which is to be actually recorded, is 50 bytes. Thus, the data amount of edit data to be actually recorded is smaller than the data amount of base data being actually recorded.

However, as shown in FIG. 6C, even in the case where a total generated code amount of an ES for edit data, the ES being separately allocated to three pictures, is 50 bytes the same as a total generated code amount of an ES for base data, if generated code amounts of portions of the ES allocated to the three pictures, are 21 bytes, 11 bytes and 18 bytes, respectively, three fillers, having bytes more than those of the fillers shown in FIG. 6B in length, are added to the portions of the ES allocated to the three pictures, respectively, and as a result, the total data amount of edit data including fillers to be actually recorded is 70 bytes. Thus, the data amount of edit data to be actually recorded is larger than the data amount of base data being actually recorded. Accordingly, in such a case, it is difficult for users to perform insertion editing.

Namely, in the case where base data and edit data are variable-length encoded, since a data amount of each filler is variable, even if a total generated code amount of an ES for base data and a total generated code amount of an ES for edit data are the same, there are sometimes cases in which it is difficult to perform insertion editing.

Accordingly, it is desirable to provide an editing apparatus, an editing method and a program, which enable insertion editing of variable-length encoded data with certainty.

An editing apparatus according to an embodiment of the present invention includes an encoding section configured to perform variable-length encoding of overwriting data used for insertion editing performed on base data, which is segmented into each picture including therein data having a predetermined unit of data amount, and includes variable-length encoded real data; a stuffing data addition section configured to sequentially obtain each picture including therein the overwriting data having been variable-length encoded by the encoding section as a target picture, if a data amount of the overwriting data included in the target picture is not equal to the predetermined unit of data amount, create insertion data included in the target picture by adding stuffing data to the overwriting data included in the target picture so that the data amount of the overwriting data included in the target picture can be equal to the predetermined unit of data amount, and if the data amount of the overwriting data included in the target picture is equal to the predetermined unit of data amount, handle the overwriting data included in the target picture, which remains as it is, as insertion data included in the target picture; a filler addition section configured to add a filler having a data amount the same as a data amount of a filler included in the base data to the insertion data having a total data amount the same as a data amount of the real data; and an insertion section configured to insert insertion data, to which the filler is added, onto the base data.

An editing method and a program according to the embodiment of the present invention correspond to the editing apparatus according to the embodiment of the present invention.

In the embodiment according to the present invention, overwriting data used for insertion editing performed on base data, which is segmented into each picture including therein data having a predetermined unit of data amount and including variable-length encoded real data, is variable-length encoded; each picture including therein the overwriting data having been variable-length encoded is sequentially obtained as a target picture; if a data amount of the overwriting data included in the target picture is not equal to the predetermined unit of data amount, insertion data included in the target picture is created by adding stuffing data to the overwriting data included in the target picture so that the data amount of the overwriting data included in the target picture can be equal to the predetermined unit of data amount, and if the data amount of the overwriting data included in the target picture is equal to the predetermined unit of data amount, the overwriting data included in the target picture, which remains as it is, is handled as insertion data included in the target picture; a filler having a data amount the same as a data amount of a filler included in the base data is added to the insertion data having a total data amount the same as a data amount of the real data; and, insertion data, to which the filler is added, is inserted onto the base data.

An editing apparatus according to another embodiment of the present invention includes an encoding section configured to perform variable-length encoding of overwriting data used for insertion editing performed on base data, which is segmented into each picture including therein data having a predetermined unit of data amount, and includes variable-length encoded real data; a stuffing data addition section configured to sequentially obtain each picture including therein the overwriting data having been variable-length encoded by the encoding section as a target picture, if a data amount of the overwriting data included in the target picture is not equal to the predetermined unit of data amount, create insertion data included in the target picture by adding stuffing data to the overwriting data included in the target picture so that the data amount of the overwriting data included in the target picture can be equal to the predetermined unit of data amount, and if the data amount of the overwriting data included in the target picture is equal to the predetermined unit of data amount, handle the overwriting data included in the target picture, which remains as it is, as insertion data included in the target picture; and an insertion section configured to insert the insertion data having a total data amount the same as a data amount of the base data onto the base data.

An editing method and a program according to the embodiment of the present invention correspond to the editing apparatus according to the embodiment of the present invention.

In the embodiment according to the present invention, overwriting data used for insertion editing performed on base data, which is segmented into each picture including therein data having a predetermined unit of data amount and including variable-length encoded real data, is variable-length encoded; each picture including therein the overwriting data having been variable-length encoded is sequentially obtained as a target picture; if a data amount of the overwriting data included in the target picture is not equal to the predetermined unit of data amount, insertion data included in the target picture is created by adding stuffing data to the overwriting data included in the target picture so that the data amount of the overwriting data included in the target picture can be equal to the predetermined unit of data amount, and if the data amount of the overwriting data included in the target picture is equal to the predetermined unit of data amount, the overwriting data included in the target picture, which remains as it is, is handled as insertion data included in the target picture; and the insertion data having a total data amount the same as a data amount of the base data is inserted onto the base data.

As described above, according to an embodiment of the present invention, it is possible to perform insertion editing of variable-length encoded data with certainty.

BRIEF DESCRIPTION OF THE DRAWINGS

FIGS. 5A, 5B and 5C are diagrams used for explanation of fillers;

FIGS. 6A, 6B and 6C are diagrams used for explanation of fillers included in base data and edit data;

FIG. 7 is a block diagram illustrating an example of a configuration of an editing system according to a first embodiment of the present invention;

FIG. 12 is a diagram illustrating a bit occupancy amount in a VBV buffer for insertion data, according to a first embodiment of the present invention;

FIGS. 13A and 13B are diagrams used for explanation of a method for adding fillers to insertion data, according to a first embodiment of the present invention;

FIGS. 17A and 17B are diagrams used for explanation of another method for adding fillers to insertion data, according to a first embodiment of the present invention;

FIGS. 22A and 22B are diagrams each illustrating an example of a configuration of recording data, according to a second embodiment of the present invention;

FIGS. 23A and 23B are diagrams each illustrating an example of a configuration of recording data, according to a second embodiment of the present invention;

FIGS. 24A and 24B are diagrams each illustrating an example of a configuration of recording data, according to a second embodiment of the present invention;

DESCRIPTION OF THE PREFERRED EMBODIMENTS

A First Embodiment

Figure 1:
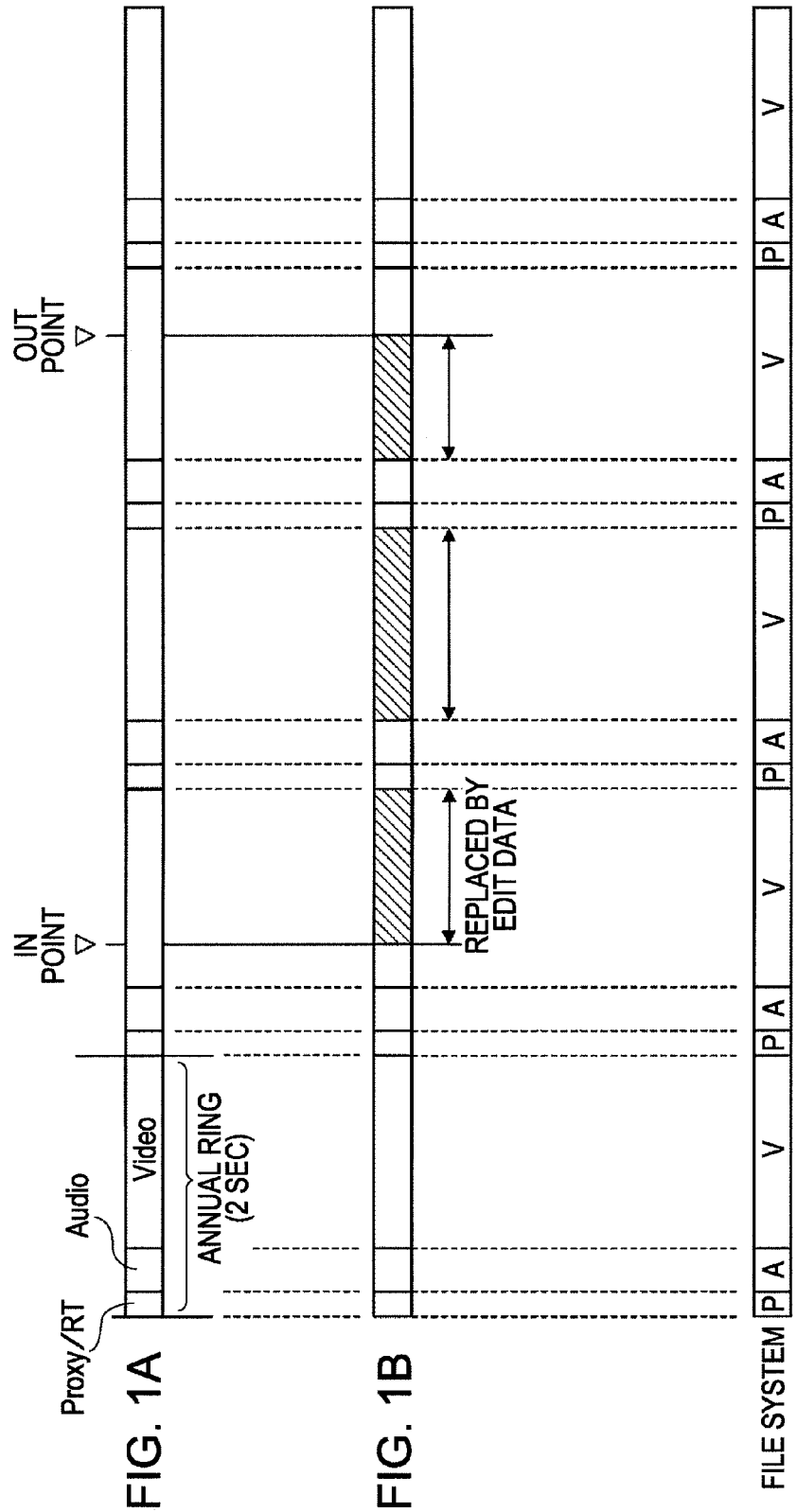
FIGS. 1A and 1B are diagrams used for explanation of an insertion editing of fixed-length encoded base data and edit data.
Figure 2:
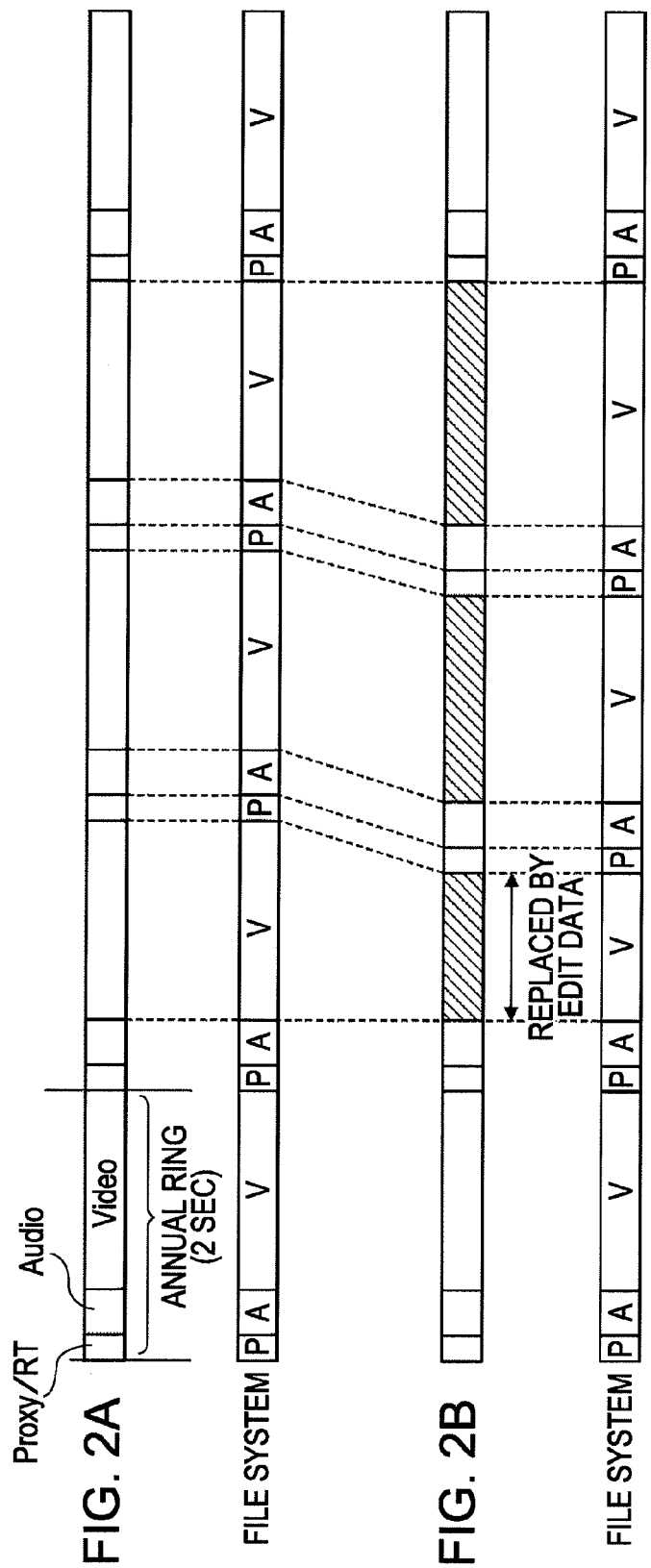
FIGS. 2A and 2B are diagrams used for explanation of an insertion editing of variable-length encoded base data and edit data.
Figure 3:
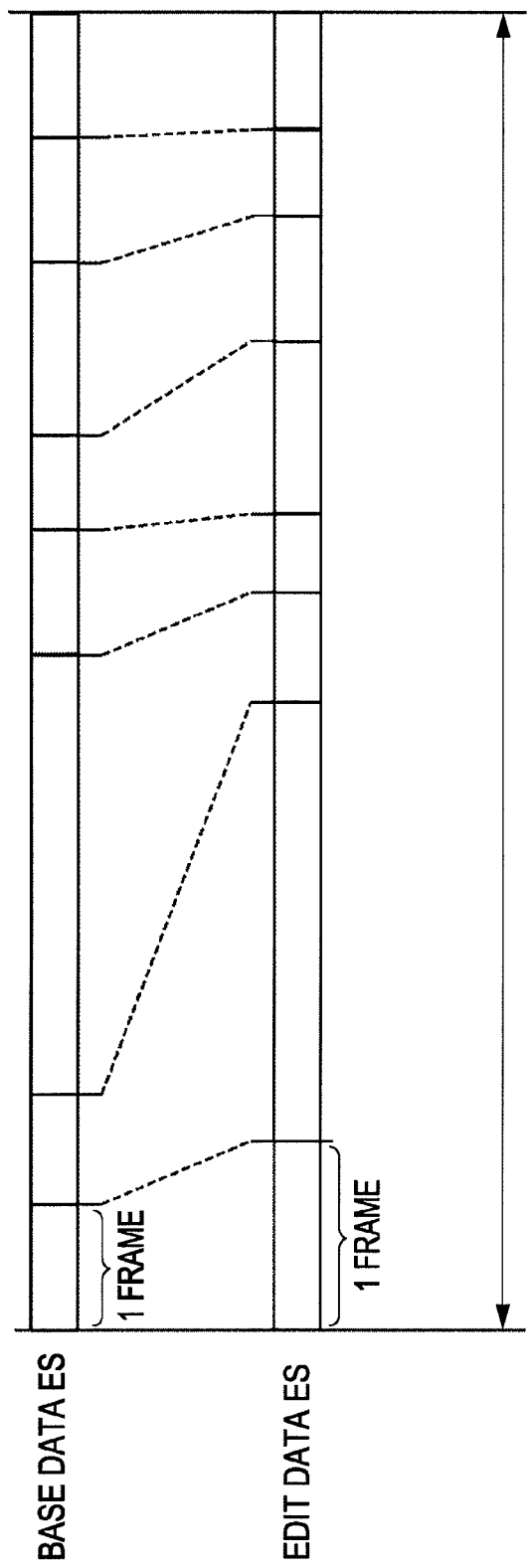
FIG. 3 is a diagram illustrating examples of an ES for base data and an ES for edit data.
Figure 4:
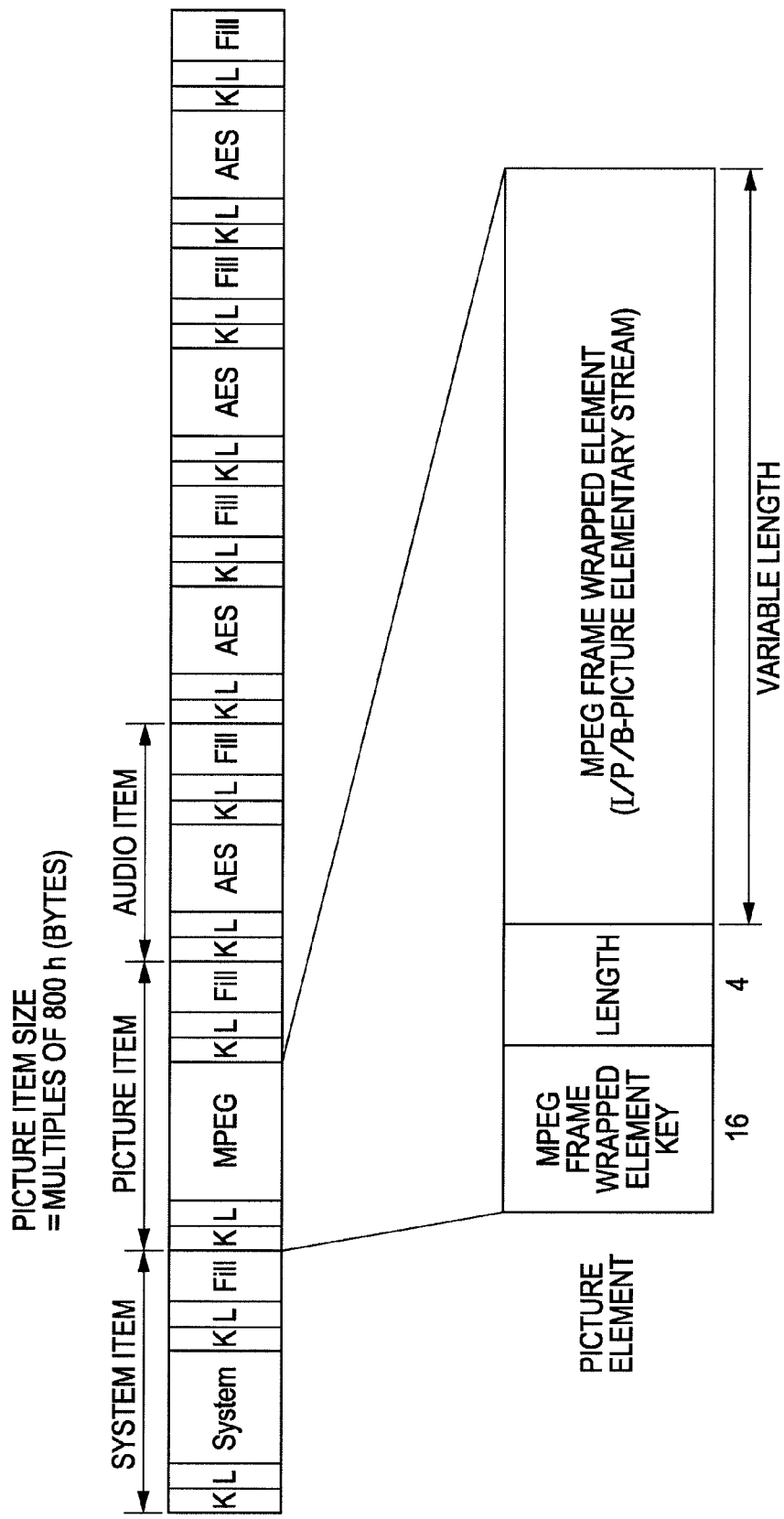
FIG. 4 is a diagram illustrating an example of a file format according to MXF.

[An Example of a Configuration of an Editing System According to a First Embodiment]

FIG. 7 is a block diagram illustrating an example of a configuration of an editing system according to a first embodiment of the present invention.

An editing system 10 shown in FIG. 7 is configured to include a recoding unit 11 (an editing apparatus), a reproducing unit 12, an editing unit 13 and a reference signal generating unit 14.

The recording unit 11 is connected to the reproducing unit 12 by using a coaxial cable. Further, the recording unit 11 is connected to the editing unit 13 via a control line. This control line is configured by using, for example, a 9-pin cable conforming to the RS-422 standard. The recording unit 11 is configured to, in accordance with control signals transmitted from the editing unit 13 via the control line, perform insertion of edit data, which is transmitted from the reproducing unit 12 as high definition serial digital interface (HD-SDI) signals, onto within an edit range included in base data recorded in recording media. Further, the recording unit 11 transmits various kinds of signals to the editing unit 13 via the control line. In addition, the recording unit 11 may record base data into recording media installed in itself.

The reproducing unit 12 is connected to the editing unit 13 via the control line just like the recording unit 11. The reproducing unit 12 is configured to, in accordance with control signals transmitted from the editing unit 13 via the control line, perform reading out of data recorded in recording media installed in itself as edit data, and supply the read-out edit data to the recording unit 11 as HD-SDI signals. Further, the reproducing unit 12 transmits various kinds of signals to the editing unit 13 via the control line.

The editing unit 13 is configured by using, for example, a remote controller. The editing unit 13 is configured to, by transmitting control signals in accordance with directions from users to the recording unit 11 and the reproducing unit 12 via the control line, perform control so as to cause the recording unit 11 and the reproducing unit 12 to perform insertion editing on a GOP-by-GOP basis. That is, the editing unit 13 performs control so as to cause the recording unit 11 and the reproducing unit 12 to overwrite edit data reproduced by the reproducing unit 12 onto an edit range included in base data which is recorded in recording media installed in the recording unit 11.

The reference signal generation unit 14 generates reference signals used as timing bases for control, as well as timing bases for recording and reproducing, with respect to the recording unit 11, the reproducing unit 12 and the editing unit 13.

[An Example of a Detailed Configuration of a Recording Unit]

Figure 8:
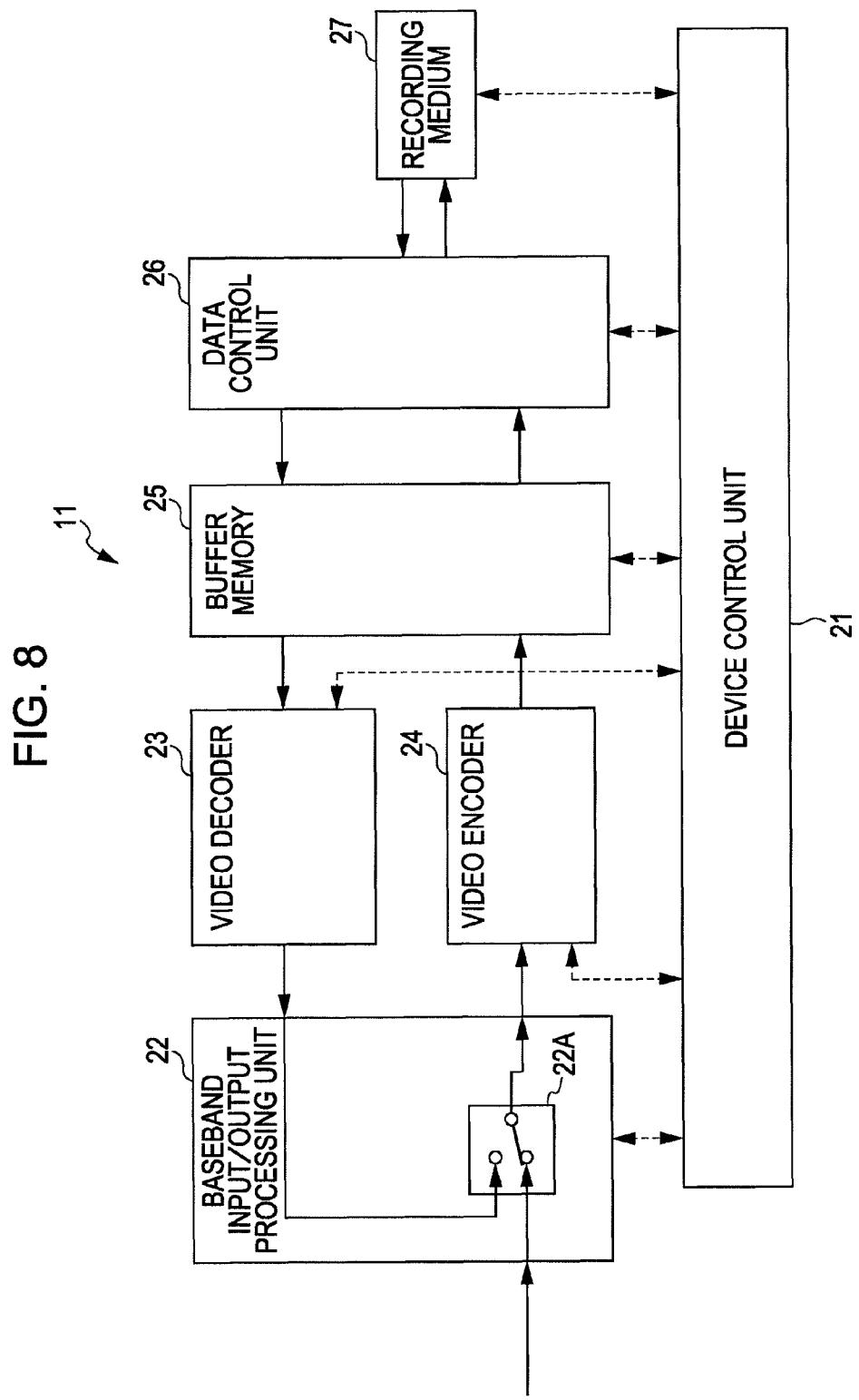
FIG. 8 is a block diagram illustrating an example of a detailed configuration of a recording unit shown in FIG. 7, according to a first embodiment of the present invention.

FIG. 8 is a block diagram illustrating an example of a detailed configuration of the recording unit 11 shown in FIG. 7.

As shown in FIG. 8, the recording unit 11 is configured to include a device control unit 21, a baseband input/output processing unit 22, a video decoder 23, a video encoder 24 (an encoding section), a buffer memory 25, a data control unit 26 (an insertion section) and a recording medium 27.

The device control unit 21 is configured by using a central processing unit (CPU) and the like. The device control unit 21 is configured to, on the basis of control signals from the editing unit 13, perform control of other units on a frame-by-frame basis or a GOP-by-GOP basis.

For example, the device control unit 21 is configured to, on the basis of a control signal supplied from the editing unit 13, which indicates an IN point having been designated by a user, perform control so as to cause the data control unit 26 to commence reading out of data from the recording medium 27, the data being included in an initial picture of a GOP including the IN point and pictures subsequent to the initial picture. Further, the device control unit 21 is configured to, on the basis of a control signal supplied from the editing unit 13, which indicates an OUT point having been designated by the user, perform control so as to cause the data control unit 26 to, upon completion of reading out of data included in a termination picture of a GOP including the OUT point, halt reading out of data from the recording medium 27.

Moreover, the device control unit 21 monitors other units. The device control unit 21 transmits signals indicating information relating to the recording unit 11, such as time code information, to the editing unit 13.

The baseband input/output processing unit 22 is configured to include a selector 22A. The baseband input/output processing unit 22 acquires edit data, which is transmitted from the reproducing unit 12 as HD-SDI signals, and supplies the acquired edit data to the selector 22A. Further, the baseband input/output processing unit 22 supplies the selector 22A with base data supplied from the video decoder 23.

The selector 22A is configured to, in accordance with control performed by the device control unit 21, select either edit data or base data, and supply the edit data or the base data selected thereby to the video encoder 24 as overwriting data.

More specifically, in the case where an IN point is located at the middle of a GOP and/or an OUT point is located at the middle of another GOP, base data aligned from an initial point to the IN point of the GOP and/or base data aligned from the OUT point to a termination point of the another GOP are (is) necessary to be encoded again, or be used as reference pictures when the base data is subjected to encoding. In such a case, therefore, the selector 22A selects the base data aligned from the initial point to the IN point of the GOP and/or the base data aligned from the OUT point to the termination point of the GOP, and supplies the selected base data to the video encoder 24 as overwriting data.

The video decoder 23 reads out base data, which is stored in the buffer memory 25 and is encoded by using a MPEG method supporting the Long-GOP structure, and decodes the read-out base data. The video decoder 23 supplies the baseband input/output processing unit 22 with base data obtained by performing the decoding processing.

The video encoder 24 encodes overwriting data supplied from the selector 22A by using a MPEG method supporting the Long-GOP structure. The video encoder 24 is configured to, by adding stuffing data to the encoded overwriting data, make a total generated code amount of the encoded overwriting data, to which the stuffing data is added, be equal to a data amount XAlign (for example, 2 Kbytes), which results from multiplying a recording unit by an arbitrary integer greater than or equal to "1". The video encoder 24 supplies the resultant data to the buffer memory 25 as insertion data.

The buffer memory 25 temporarily retains therein the insertion data supplied from the video encoder 24. Further, the buffer memory 25 temporarily retains therein base data supplied from the data control unit 26.

The data control unit 26 reads out insertion data from the buffer memory 25. The data control unit 26 is configured to, in accordance with necessity, add a filler having a data amount equal to a recording unit to the insertion data. The data control unit 26 is configured to, for each recording unit of data, perform recording of insertion data, to which the filler is added, or insertion data, which remains as it is, into the recording medium 27 as recording data.

Further, the data control unit 26 is configured to, in accordance with control performed by the device control unit 21, read out base data, which is encoded by using an MPEG method supporting the Long-GOP structure, from the recording medium 27. The data control unit 26 removes fillers from the read-out base data, and supplies the resultant base data to the buffer memory 25. Further, the data control unit 26 recognizes a data amount of fillers included in the read-out base data.

The recording medium 27 is configured by using a removal medium, such as an optical disk or a flash memory, or a high-capacity recording medium, such as a hard disk drive (HDD).

Figure 9:
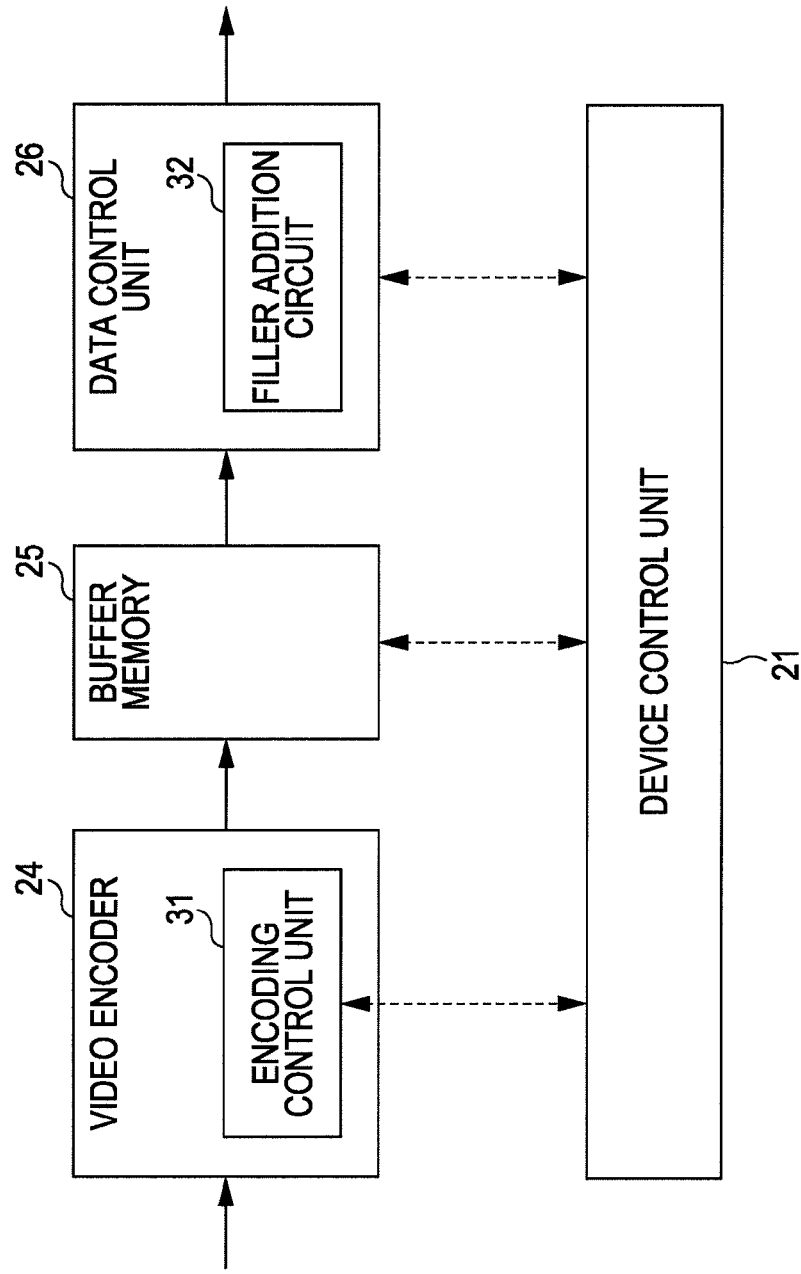
FIG. 9 is a diagram used for detailed explanation of processes performed when performing recording of insertion data, according to a first embodiment of the present invention.

FIG. 9 is a diagram used for detailed explanation of processes performed by the video encoder 24, the data control unit 26 and the like when performing recording of insertion data.

As shown in FIG. 9, the video encoder 24 is configured to include an encoding control unit 31 (a stuffing data addition section) for performing control of encoding. The encoding control unit 31 monitors a bit occupancy amount in a video buffering verifier (VBV) buffer. Further, the encoding control unit 31 performs control so as to make a generated code amount of insertion data included in each picture be equal to the data amount XAlign. More specifically, the encoding control unit 31 creates insertion data by adding stuffing data to encoded overwriting data included in each picture so that the generated code amount of insertion data included in each picture can be equal to the data amount XAlign. This created insertion data is temporarily retained in the buffer memory 25.

The data control unit 26 is configured to include a filler addition circuit 32 for adding a filler having the data amount XAlign to insertion data included in each picture. The data control unit 26 is configured to, in accordance with control performed by the device control unit 21, read out base data included within a range, onto which insertion data is to be inserted (hereinafter, the range will be called a re-encoding range) from the recording medium 27. More specifically, the data control unit 26 determines a range extending from an initial picture of a GOP including an IN point to a termination picture of a GOP including an OUT point as a re-encoding range, and reads out base data included within the re-encoding range. Further, the data control unit 26 recognizes a data amount of fillers included in the read-out base data.

The filler addition circuit 32 adds a filler having the same data amount as fillers included in base data within a re-encoding range, onto which the insertion data is to be inserted, to insertion data included in a last of pictures having been read out from the buffer memory 25 by the data control unit 26.

[Explanation of a Bit Occupancy Amount in a VBV Buffer Prior and Post to Editing]

Figure 10:
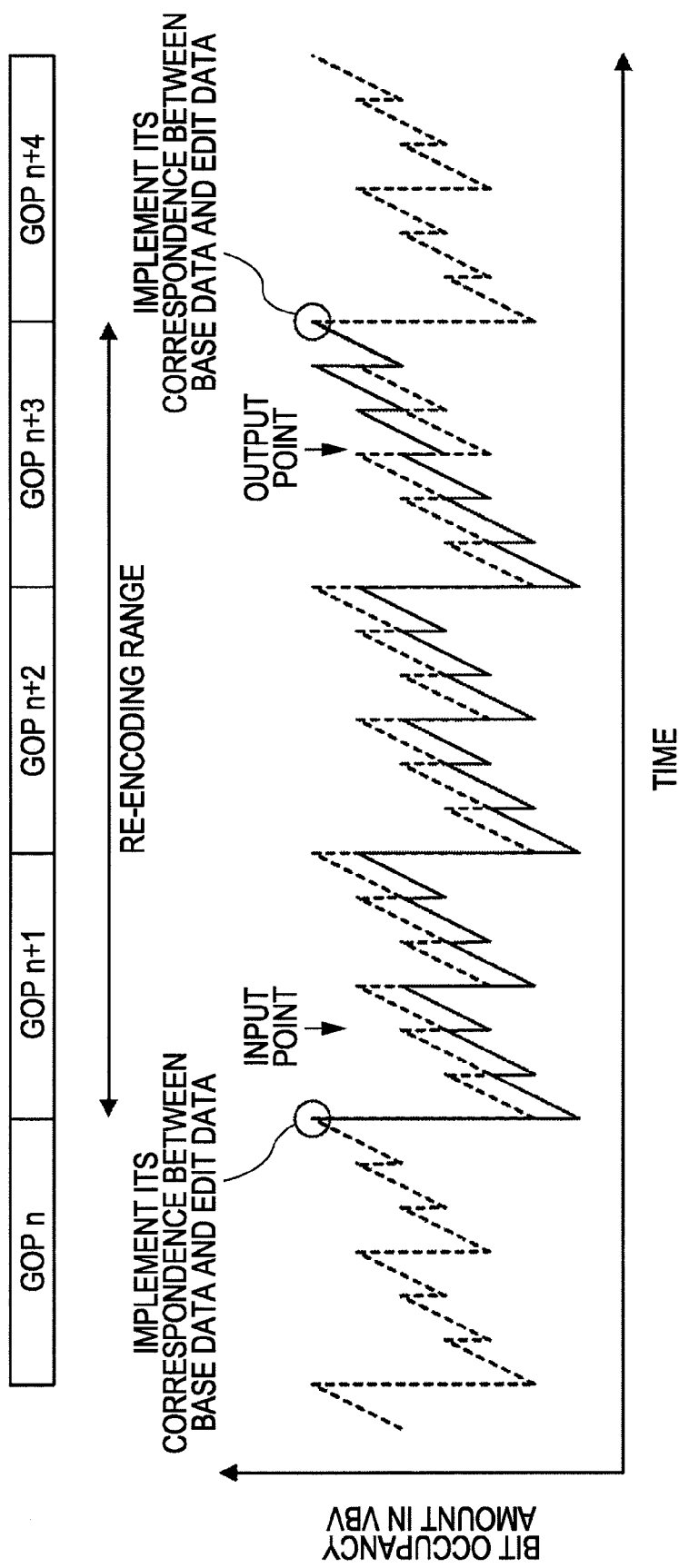
FIG. 10 is a diagram illustrating a bit occupancy amount in a VBV buffer with respect to base data and insertion data, according to a first embodiment of the present invention.

FIG. 10 is a diagram illustrating a bit occupancy amount in a VBV buffer with respect to base data and insertion data.

In a graph shown in FIG. 10, a horizontal axis and a vertical axis represent a time dimension and a bit occupancy amount in a VBV buffer, respectively. Further, in the graph shown in FIG. 10, a dashed line represents a temporal change of a bit occupancy amount in a VBV buffer for base data, and a full line represents a temporal change of a bit occupancy amount in a VBV buffer for insertion data. Therefore, an inclination between any two points on the dashed line (the full line) indicates a bit rate of the base data (the insertion data) during an interval between the two points, and a length of a vertical direction difference between any two points on the dashed line (the full line) indicates a generated code amount of the base data (the insertion data) during an interval between the two points.

In an example shown in FIG. 10, a certain picture included in an (n+1)th GOP is designated as an IN point, and another certain picture included in an (n+3)th GOP is designated as an OUT point. Therefore, a range extending from the beginning of the (n+1)th GOP to the termination of the (n+3)th GOP is determined as a re-encoding range. Further, base data and edit data included in a range extending from a start point of the re-encoding range to the IN point, and further, base data included in a range extending from the OUT point to an end point of the re-encoding range are encoded by the video encoder 24.

As shown in FIG. 10, this encoding is performed so that frame rates and bit rates within the re-encoding range with respect to the base data and the insertion data can correspond to each other, and further, a total generated code amount of an ES for base data and a total generated code amount of an ES for insertion data within the re-encoding range can correspond to each other.

In this manner, the number of pictures with respect to base data and insertion data within the re-encoding range correspond to each other. Further, a bit occupancy amount in a VBV buffer for a first of pictures, each including base data therein, within a re-encoding range, and a bit occupancy mount in a VBV buffer for a first of pictures, each including insertion data therein, within the same re-encoding range result in the same amount. Moreover, a bit occupancy amount in a VBV buffer for a last of pictures, each including base data therein, within a re-encoding range, and a bit occupancy mount in a VBV buffer for a last of pictures, each including insertion data therein, within the same re-encoding range result in the same amount. Thus, data resulting from performing such insertion editing processing as described above is realized as a stream of data.

[Explanation of Insertion Data]

Figure 11A:
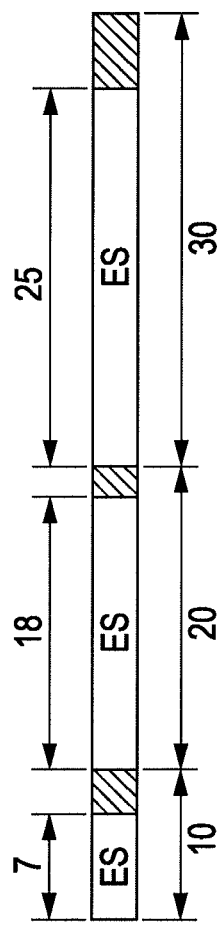
FIGS. 11A and 11B are diagrams illustrating examples of configurations of base data and insertion data, according to a first embodiment of the present invention.

FIGS. 11A and 1B are diagrams illustrating respective examples of configurations of base data and insertion data.

As shown in FIG. 11A, in the case where a recording unit of data is 10 bytes, and generated code amounts of three portions of an ES for base data, the three portions of an ES being included in the corresponding three pictures, are 7 bytes, 18 bytes and 25 bytes, respectively, and fillers, each having 3 bytes, 2 bytes and 5 bytes in length, are added to the three pictures, respectively. Therefore, the total generated code amount of the three portions of the ES for base data, the three portions of the ES being included in the corresponding three pictures, is 50 bytes, but the total data amount of the base data included in the three pictures, which is to be recorded into the recording medium 27, is 60 bytes.

Further, upon receipt of overwriting data included in three pictures, which is to be overwritten on a re-encoding range, i.e., a range including three pictures each having base data allocated therein, the base data being recorded in the recoding medium 27 in such a configuration as described above, the video encoder 24 encodes the received overwriting data included in the three pictures. Further, the video encoder 24 adds stuffing data to each block of overwriting data resulting from the encoding, which is included in the corresponding picture of the three pictures, so as to make a data amount of each block of overwriting data included in each of the three pictures be equal to the data amount XAlign, and thereby, creates an ES for insertion data. In addition, the video encoder 24 performs encoding so that a total generated code amount of base data included within the re-encoding range of the ES for base data, and a total generated code amount of insertion data included within the same re-encoding range of an ES for insertion data can be the same.

Figure 11B:
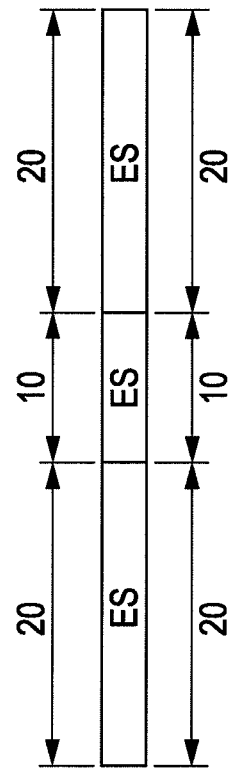

Therefore, for example, as shown in FIG. 11B, a generated code amount of each of three portions of an ES for insertion data, which are included in respective three pictures, is 20 bytes, which is twice the recording unit of data; 10 bytes, which is equal to the recording unit of data; and 20 bytes, which is twice the recording unit of data. Therefore, it is unnecessary to add a filler to each of the three portions of the ES for insertion data, which are included in the respective three pictures. Further, as shown in FIG. 11B, the total generated code amount of three portions of the ES for insertion data is 50 bytes, which are the same as the total generated code amount of the three portions of the ES for base data.

Therefore, the minimum size of a recording range necessary for insertion data to be recorded thereonto is 50 bytes, which are smaller than the size of the re-encoding range, i.e., 60 bytes. Thus, it is possible to perform insertion editing.

FIG. 12 is a diagram illustrating a bit occupancy amount in a VBV buffer for insertion data.

In a graph shown in FIG. 12, a horizontal axis and a vertical axis represent a time dimension and a bit occupancy amount in a VBV buffer, respectively. Further, in the graph shown in FIG. 12, a full line represents a temporal change of a bit occupancy amount in a VBV buffer for insertion data. Therefore, an inclination between any two points on the full line indicates a bit rate of the insertion data during an interval between the two points, and a length of a vertical direction difference between any two points on the full line indicates a generated code amount of the insertion data during an interval between the two points.

As shown in FIG. 12, stuffing data is added to overwriting data included in each of pictures except a last picture within a re-encoding range so as to make a generated code amount of the picture be equal to the amount of data XAlign.

Further, as shown in FIG. 12, if a bit occupancy amount in a VBV buffer of a picture after completion of insertion editing (hereinafter, which will be called a connection point), the picture, i.e., the connection point, indicating a picture subsequent to a last picture including an end point of a re-encoding range, is larger than a bit occupancy amount in a VBV buffer of a connection point before commencement of the insertion editing, stuffing data for occupancy is added to overwriting data included in the last picture. In such a manner, a bit occupancy amount in a VBV buffer at a connection point before commencement of insertion editing can be the same as a bit occupancy amount in a VBV buffer at a connection point after completion of the insertion editing.

[Explanation of a Method for Adding a Filler]

FIGS. 13A and 13B are diagrams used for explanation of a method for adding a filler.

As shown in FIG. 13B, since a total generated code amount of a portion of an ES for insertion data, which is included in each of pictures, is the data amount XAlign, it is unnecessary to add a filler to the portion of the ES for insertion data, which is included in each of the picture. Therefore, in the case where base data within a re-encoding range is such as shown in FIG. 13A, as shown in FIG. 13B, a filler, having a data amount resulting from totaling a data amount of each of fillers included in the base data shown in FIG. 13A, is added to a portion of an ES for insertion data, which is included in a last picture.

In such as a manner, the above-described processing makes a total data amount of recording data, i.e., insertion data and a filler added to a portion of insertion data included in a last picture be the same as a total data amount of base data included within the re-encoding range, and thus, enables replacement of the base data included within the re-encoding range by the recording data with certainty.

[Explanation of Processing Performed by a Recording Unit]

Figure 14:
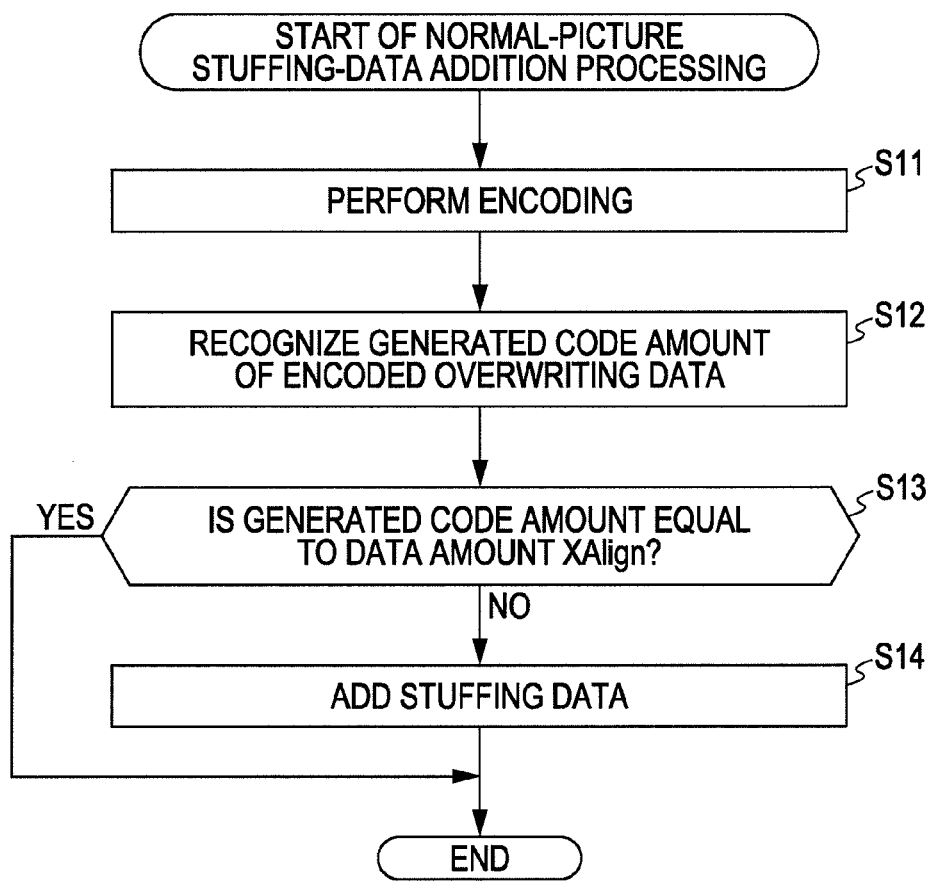
FIG. 14 is a flowchart used for explanation of normal-picture stuffing-data addition processing according to a first embodiment of the present invention.

FIG. 14 is a flowchart illustrating normal-picture stuffing-data addition processing performed by the video encoder 24 of the recording unit 11. This normal-picture stuffing-data addition processing is commenced, for example, when overwriting data included in each of pictures except a last picture within a re-encoding range is inputted from the selector 22A to the video encoder 24.

In step S11, the video encoder 24 performs encoding of overwriting data included in a certain picture, which is inputted from the selector 22A. In step S12, the encoding control unit 31 (refer to FIG. 9) of the video encoder 24 recognizes a reference-code amount of the encoded overwriting data.

In step S13, the encoding control unit 31 determines whether the recognized generated code amount is equal to the data amount VAlign, or not. In step S13, if it is determined that the recognized generated code amount is not equal to the data amount VAlign, the process flow proceeds to step S14.

In step S14, the encoding control unit 31 adds stuffing data to the overwriting data having been encoded in step S11 so as to make a generated code amount be equal to the data amount XAlign. Further, the encoding control unit 31 supplies the buffer memory 25 with encoded overwriting data having the stuffing data added thereto as insertion data, and then, the process flow is terminated.

In contrast, in step S13, if it is determined that the recognized generated code amount is equal to the data amount VAlign, the processes performed in step S14 are skipped, and the encoded overwriting data, which remains as it is, is supplied to the buffer memory 25 as insertion data. Further, the process flow is terminated.

Figure 15:
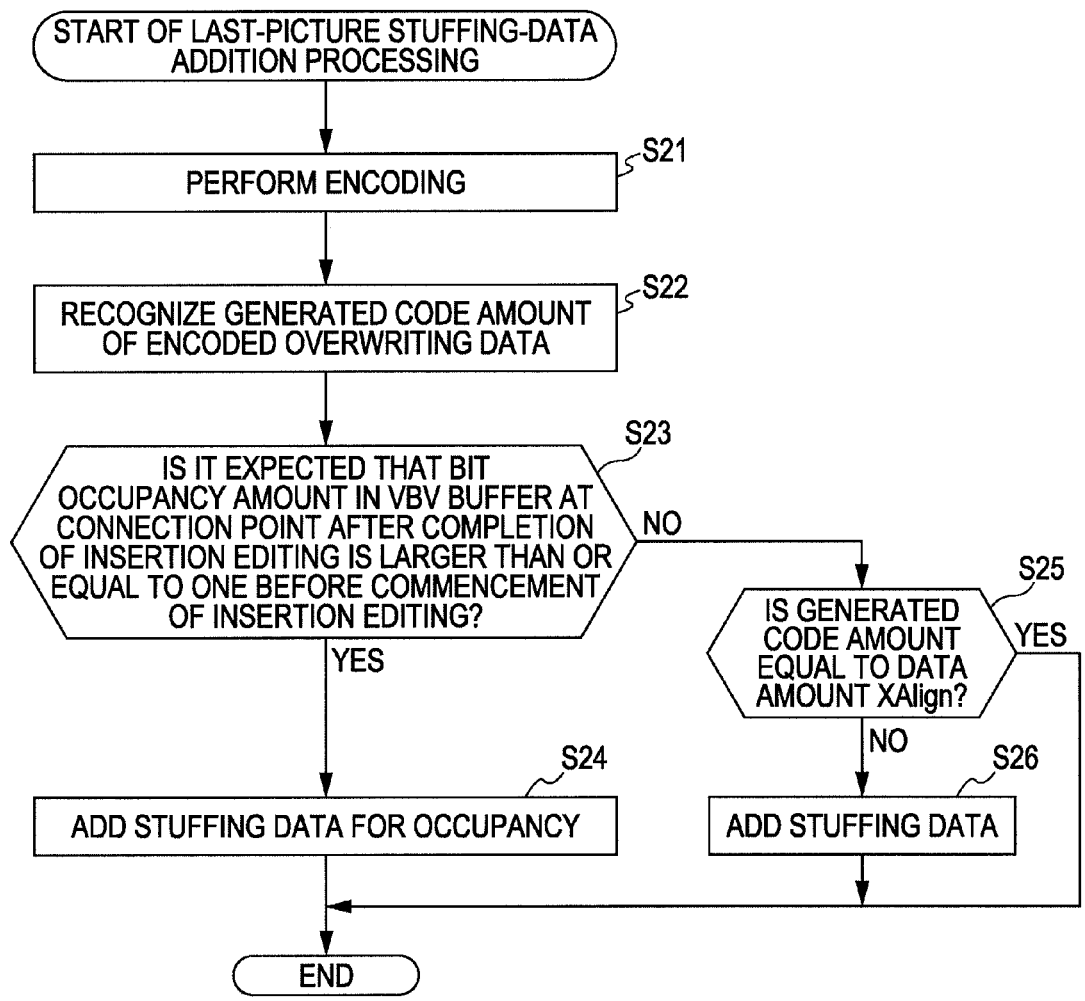
FIG. 15 is a flowchart used for explanation of last-picture stuffing-data addition processing according to a first embodiment of the present invention.

FIG. 15 is a flowchart illustrating last-picture stuffing-data addition processing performed by the video encoder 24. This last-picture stuffing-data addition processing is commenced, for example, when overwriting data included in a last of pictures within a re-encoding range is inputted from the selector 22A to the video encoder 24.

Processes performed in steps S21 and S22 are the same as or similar to those of steps S11 and S22 shown in FIG. 14, except for a fact that a target for processing is data included in a last picture, and thus, descriptions thereof are omitted here.

In step S23, the encoding control unit 31 determines whether a bit occupancy amount in a VBV buffer at a connection point after completion of insertion editing is likely to be larger than or equal to a bit occupancy amount in a VBV buffer at a connection point before commencement of the insertion editing, or not.

In step S23, if it is determined that a bit occupancy amount in a VBV buffer at the connection point after completion of insertion editing is likely to be larger than or equal to a bit occupancy in a VBV buffer at the connection point before commencement of the insertion editing, that is, if it is determined that it is likely to be possible to connect a last picture of insertion data to a connection point of base data, the process flow proceeds to step S24.

In step S24, the encoding control unit 31 adds stuffing data for occupancy to the overwriting data having been encoded in step S21 so as to make a bit occupancy amount in a VBV buffer at the connection point after completion of insertion editing be the same as a bit occupancy amount in a VBV buffer at the connection point before commencement of the insertion editing. Further, the encoding control unit 31 supplies the buffer memory 25 with encoded overwriting data having stuffing data for occupancy added thereto as insertion data.

In contrast, in step S23, if it is determined that a bit occupancy amount in a VBV buffer at the connection point after completion of insertion editing is unlikely to be larger than or equal to a bit occupancy amount in a VBV buffer at the connection point before commencement of insertion editing, that is, if it is determined that it is unlikely to be possible to connect the last picture of insertion data to the connection point of base data, the process flow proceeds to step S25.

In step S25, the encoding control unit 31 determines whether a generated code amount of the overwriting data having been encoded in step S21 is equal to the data amount XAlign, or not. If it is determined that a generated code amount of the overwriting data having been encoded in step S21 is not equal to the data amount XAlign, the process flow proceeds to step S26.

In step S26, the encoding control unit 31 adds stuffing data to the overwriting data having been encoded in step S21 so as to make the generated code amount therefor be equal to the data amount XAlign. Further, the encoding control unit 31 supplies the buffer memory 25 with overwriting data having stuffing data added thereto as insertion data, and then, the process flow is terminated.

In contrast, in step S25, if it is determined that a generated code amount of the overwriting data having been encoded in step S21 is equal to the data amount XAlign, the processing performed in step S25 is skipped, and the encoded overwriting data, which remains as it is, is supplied to the buffer memory 25 as insertion data, and then, the process flow is terminated.

In addition, in step S23, if it is determined that a bit occupancy amount in a VBV buffer at the connection point after completion of insertion editing is unlikely to be larger than or equal to a bit occupancy amount in a VBV buffer at the connection point before commencement of insertion editing, it is difficult to connect the last picture of insertion data to the connection point of base data. Therefore, an end point of the re-encoding range is set again so that a bit occupancy in a VBV buffer at the connection point after completion of insertion editing is larger than or equal to a bit occupancy amount in a VBV buffer at the connection point before commencement of insertion editing.

Figure 16:
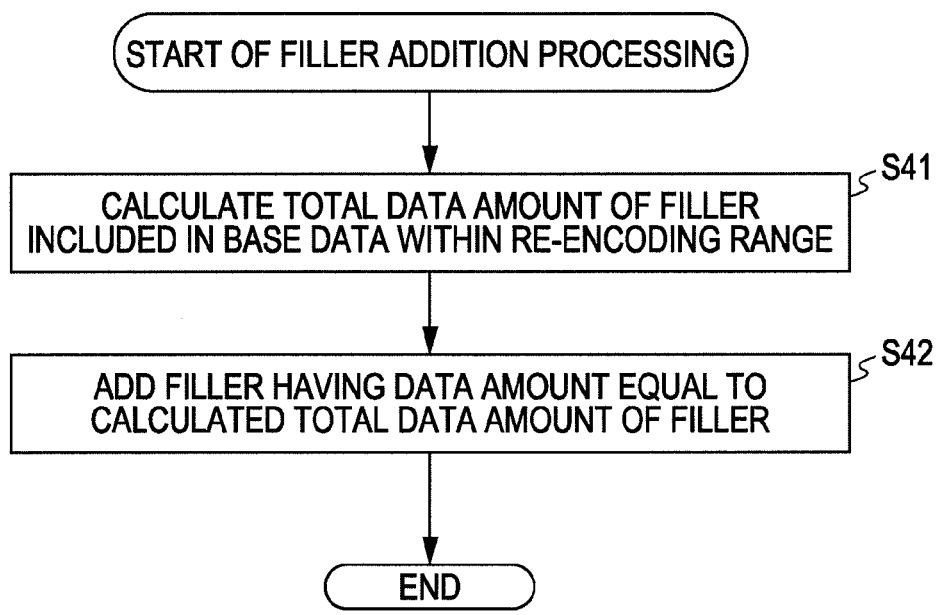
FIG. 16 is a flowchart used for explanation of filler addition processing performed by a data control unit, according to a first embodiment of the present invention.

FIG. 16 is a flowchart illustrating filler addition processing performed by the data control unit 26. This filler addition processing is commenced, for example, when insertion data included in a last picture is read out from the buffer memory 25.

In step S41, the data control unit 26 calculates a total data amount of fillers included in base data within a re-encoding range, which has been read out from the recording medium 27. In step S42, the filler addition circuit 32 (refer to FIG. 9) of the data control unit 26 adds a filler having a data amount equal to the total data amount of the fillers, which was calculated in step S41, to insertion data included in the last picture. This insertion data having the filler added thereto is recorded into the recording medium 27 as recording data for each recording unit.

[Explanation of Another Method for Adding Fillers]

FIGS. 17A and 17B are diagrams illustrating another method for adding fillers to insertion data.

In a method for adding fillers, such as shown in FIGS. 17A and 17B, a filler having a data amount the same as a total data amount of fillers included in base data is added to pictures except a last picture separately for each block of data having the data amount XAlign, and a filler having a remaining data amount is added to the last picture.

For example, as shown in FIGS. 17A and 17B, a filler having a data amount the same as a total data amount of fillers included in base data shown in FIG. 17A is added to partials of an ES included in a first picture and a third picture separately for each block of data having the data amount XAlign, and a filler having a remaining data amount is added to a partial of the ES included in a last picture. In this manner, the total data amount of base data within a re-encoding range becomes equal to the total data amount of insertion data having fillers added thereto, i.e., recording data.

[Explanation of Another Filler Addition Processing]

Figure 18:
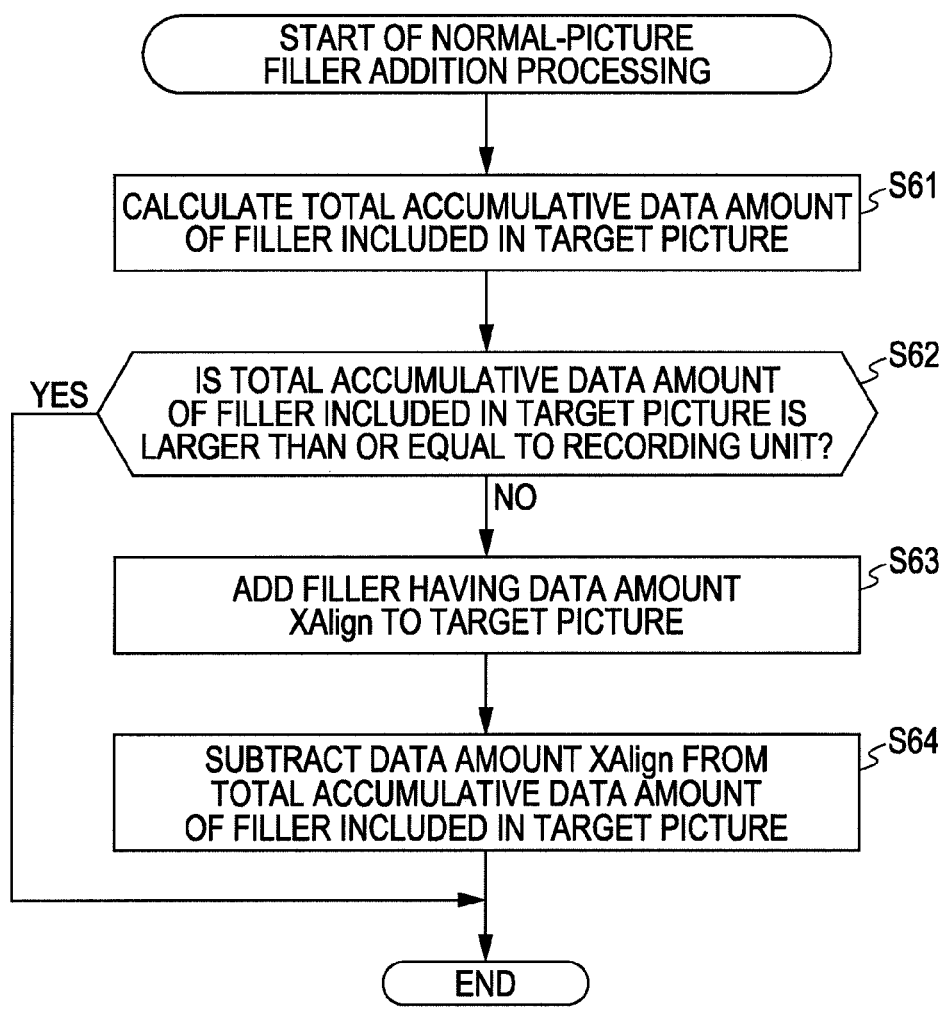
FIG. 18 is a flowchart used for explanation of normal-picture filler addition processing according to a first embodiment of the present invention.

FIG. 18 is a flowchart used for explanation of a normal-picture filler addition processing performed by the data control unit 26. This normal-picture filler addition processing is commenced, for example, when each of pictures except a last picture, which has insertion data therein, is read out as a target picture.

In step S61, the data control unit 26 calculates a total accumulative data amount corresponding to a filler included in a target picture. More specifically, the data control unit 26 calculates a total accumulative data amount corresponding to a filler included in a target picture by adding a data amount of a filler, which is added to a base data included in a picture corresponding to the target picture, to a total accumulative data amount corresponding to a filler included in a picture immediately prior to the target picture. In addition, if a target picture is a first of pictures including insertion data therein, the data control unit 26 handles a data amount of a filler which is added to base data included in a picture corresponding to the target picture as a total accumulative data amount corresponding to a filler included in the target picture.

That is, a total accumulative data amount corresponding to a filler included in a target picture is a subtraction value resulting from subtracting a total data amount of portions of a filler, which have been added to respective blocks of insertion data included in pictures from a first picture to a picture immediately prior to the target picture within a re-encoding range from a total data amount of portions of a filler, which are added to respective blocks of base data included in pictures from a first picture to a picture corresponding to the target picture within the re-encoding range.

In step S62, the data control unit 26 determines whether the calculated total accumulative data amount corresponding to a filler included in the target picture is larger than or equal to a recording unit, or not. In step S62, if it is determined that the calculated total accumulative data amount corresponding to a filler included in the target picture is larger than or equal to the recording unit, in step S63, the filler addition circuit 32 adds a filler having the data amount XAlign, which is smaller than the total accumulative data amount corresponding to a filler included in the target picture, to insertion data included in the target picture.

In step S64, the data control unit 26 updates a value of a total accumulative data amount corresponding to a filler included in a target picture to a value obtained by subtracting the data amount XAlign, i.e., the data amount of the filler which was added to insertion data included in the target picture in step S63, from the total accumulative data amount corresponding to a filler included in the target picture, which was calculated in step S61. Further, the process flow is terminated. The total accumulative data amount to a filler included in the target picture, which was undated in step S64, is used for a calculation of a total accumulative data amount corresponding to a filler to be added to insertion data included in a subsequent target picture.

In contrast, in step S62, if it is determined that the calculated total accumulative data amount corresponding to a filler included in the target picture is smaller than the recording unit, the processes performed in steps S63 and S64 are skipped, and then, the process flow is terminated.

Figure 19:
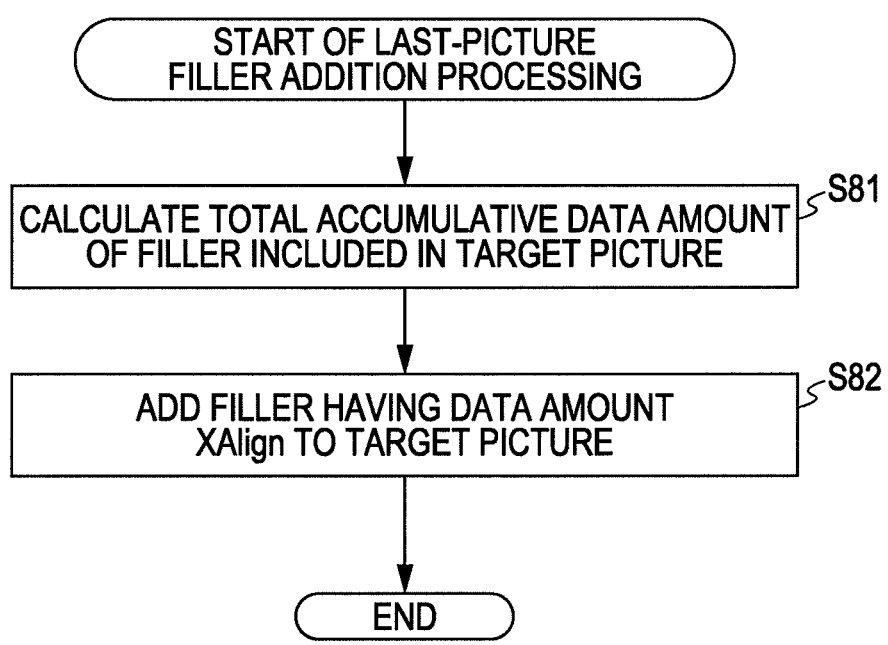
FIG. 19 is a flowchart used for explanation of filler addition processing according to a first embodiment of the present invention.

FIG. 19 is a flowchart illustrating last-picture filler addition processing performed by the data control unit 26. This last-picture filler addition processing is commenced, for example, when a last picture including insertion data therein is read out from the buffer memory 25 as a target picture.

In step S81, the data control unit 26 calculates a total accumulative data amount of a filler added to a target picture in the same manner as or in a manner similar to that of processes performed in step S61 shown in FIG. 18. In step S82, the filler addition circuit 32 adds a filler having a total accumulative data amount corresponding to a target picture to the target picture, and then, the process flow is terminated.

As described above, the recording unit 11 performs encoding so that, within a re-encoding range, a total generated code amount of base data and a total generated code amount of insertion data can be the same. Further, the recording unit 11 certainly makes a generated code amount of insertion data included in each picture be equal to the data amount XAlign by adding stuffing data to encoded overwriting data included in each picture. Therefore, it is unnecessary to add a filler when performing recording of insertion data, and there is no case where a total data amount of insertion data is larger than a total data amount of base data within a re-encoding range. Accordingly, the recording unit 11 can perform insertion editing of edit data with certainty, which is variable-length encoded by using an MPEG method supporting the Long-GOP structure.

In contrast to this method, a method, in which, in order to prevent a total data amount of actually overwritten data from being larger than a total data amount of base data within a re-encoding range, a bit rate of overwriting data is made lower than a bit rate of base data, causes degradation of produced images due to insertion editing.

Further, the recording unit 11 certainly makes a generated code data of each block of insertion data be equal to the data amount XAlign, and thus, even when the recording medium 27 is a recording medium, for which a data amount of a filler included in base data is ambiguous, it is possible to perform insertion editing with certainty.

In addition, the recording unit 11 performs encoding so as to make a total data amount of an ES for base data and a total data amount of an ES for insertion data be the same, but the recording unit 11 may perform encoding so as to make a data amount of base data including fillers and a total data amount of insertion data included in an ES be the same. In this case, it is possible to utilize the fillers included in the base data effectively.

Further, in this case, a method, in which, along with calculation of a total accumulative data amount of a filler, on the basis of the calculation result, a filler is separately added to each of portions of an ES, which are included in respective pictures except a last picture, leads to a more effective utilization of a filler included in base data, compared with a method, in which the filler is added to only a portion of an ES, which is included in the last picture.

A Second Embodiment

[An Example of a Configuration of a Recording Unit According to a Second Embodiment]

Figure 20:
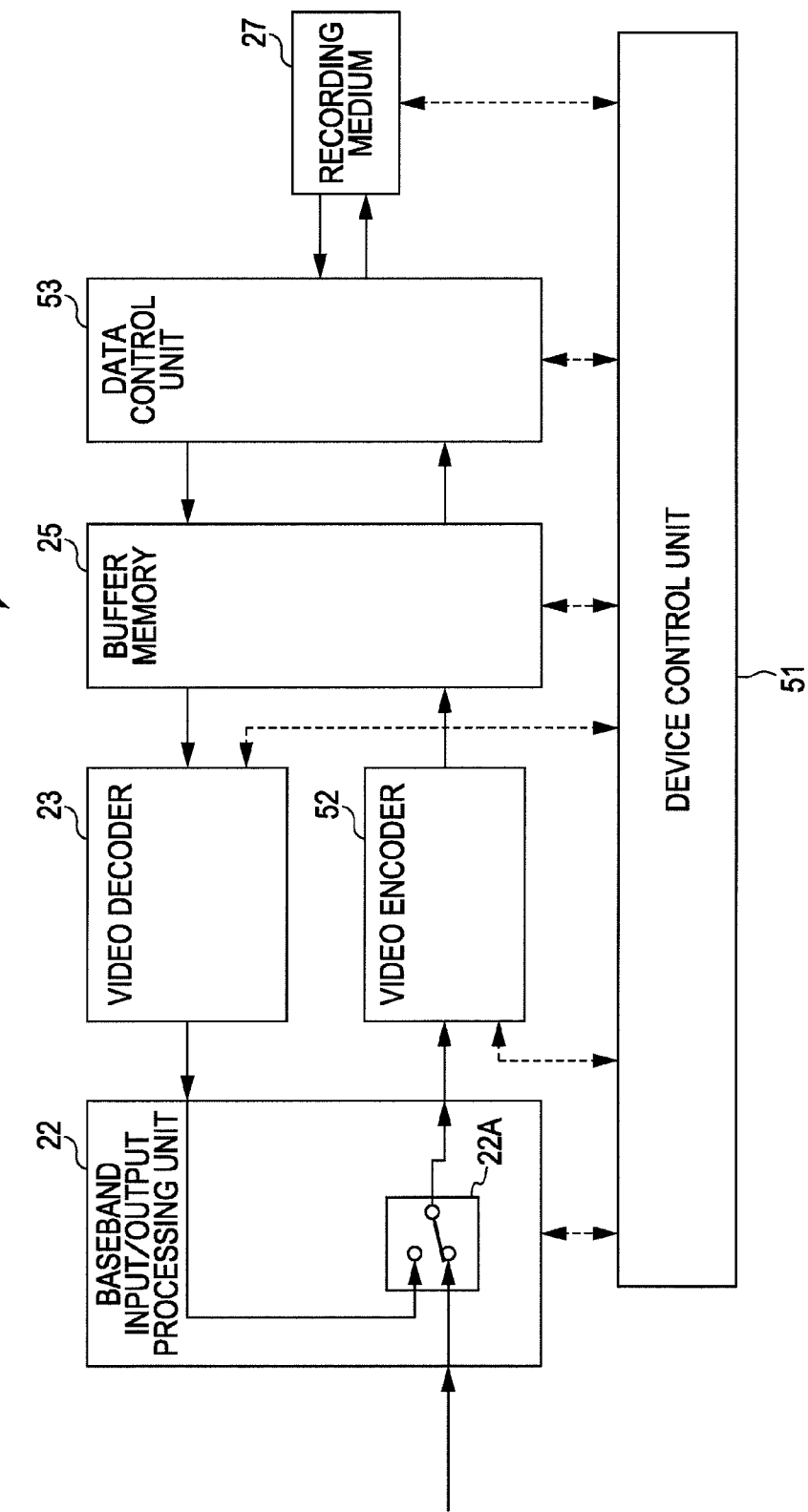
FIG. 20 is a block diagram illustrating an example of a configuration of a recording unit included in an editing system according to a second embodiment of the present invention.

FIG. 20 is a block diagram illustrating an example of a configuration of a recording unit 50 according to a second embodiment of editing systems to which the present invention is applied.

Among components shown in FIG. 20, the same components as the components shown in FIG. 8 are denoted by the same reference numerals as those of the components, respectively. Further, hereinafter, duplicated description will be appropriately omitted.

It mostly differs from the configuration shown in FIG. 8 that the recording unit 50 shown in FIG. 20 is configured to include a device control unit 51, a video encoder 52 and a data control unit 53 as substitutes for the device control unit 21, the video encoder 24 and the data control unit 26, respectively.

The recording unit 50 is not configured to create insertion data having the data amount XAlign for each of pictures including overwriting data, but is configured to, in accordance with a data amount of a filler included in each block of base data, determine whether insertion data having the data amount XAlign is to be created, or encoded overwriting data is to be used as insertion data as it is.

More detailed explanation will be hereinafter made. The device control unit 51 is configured by using a CPU and the like just like the device control unit 21 shown in FIG. 8. The device control unit 51 is configured to, on the basis of control signals and the like from the editing unit 13, perform control of other components for each frame or for each GOP.

For example, the device control unit 51 is configured to, just like the device control unit 21, on the basis of a control signal supplied from the editing unit 13, which indicates an IN point having been designated by a user, perform control so as to cause the data control unit 53 to commence reading out of data from the recording medium 27, the data being included in an initial picture of a GOP including the IN point and pictures subsequent to the initial picture. Further, the device control unit 51 is configured to, just like the device control unit 21, on the basis of a control signal supplied from the editing unit 13, which indicates an OUT point having been designated by the user, perform control so as to cause the data control unit 53 to, upon completion of reading out of data included in a termination picture of a GOP including the OUT point, halt reading out of data from the recording medium 27.

Further, the device control unit 51 is configured to, on the basis of a control signal supplied from the editing unit 13, which indicates an input point having been designated by a user, perform control so as to cause the data control unit 53 to acquire a total data amount of a filler included in base data within a predetermined range extending from a start point of a re-encoding range. Further, the device control unit 51 is configured to supply the video encoder 52 with the acquired total data amount of a filler as a predicted usable total data amount. Further, the device control unit 51 is configured to perform control so as to cause the data control unit 53 to acquire a total data amount of a filler which has already been added to insertion data, and supply the video encoder 52 with the acquired total data amount as an addition completed total data amount.

Moreover, the device control unit 51 is configured to, just like the device control unit 21, monitor other components. The device control unit 51 is configured to, just like the device control unit 21, transmit signals indicating information relating to the recording unit 11, such as time code information, to the editing unit 13.

The video encoder 52 is configured to, just like the video encoder 24 shown in FIG. 8, encode overwriting data supplied from the selector 22A by using an MPEG method supporting the long-GOP structure. The video encoder 52 is configured to, on the basis of the predicted usable total data amount and the addition completed total data amount, set an encoding mode to an align control mode or a normal mode. In addition, the align control mode is a mode, in which a block of insertion data having the data amount XAlign is created from a block of encoded overwriting data, while the normal mode is a mode, in which a block of encoded overwriting data is handled as a block of insertion data as it is.

The video encoder 52 is configured to, under the align control mode, by adding stuffing data to a block of encoded overwriting data, make a generated code amount of the resultant block of data be equal to the data amount XAlign. Further, the video encoder 52 is configured to supply the resultant block of data with the buffer memory 25 as a block of insertion data. Further, the video encoder 52 is configured to, under the normal mode, supply the buffer memory 25 with a block of encoded overwriting data, which remains as it is, as a block of insertion data.

The data control unit 53 is configured to, just like the data control unit 26 shown in FIG. 8, read out insertion data from the buffer memory 25. The data control unit 53 is configured to, by adding a filler to a block of insertion data included in each picture, which has a data amount other than the data amount XAlign, make the data amount of the resultant block of data be equal to the data amount XAlign. Further, the data control unit 53 is configured to, on the basis of the predicted usable total data amount and the addition completed total data amount, add a filler having the data amount XAlign to a block of insertion data having the data amount XAlign included in each of relevant pictures. The data control unit 53 is configured to, for each recording unit, record blocks of insertion data each having a filler added thereto, and blocks of insertion data each remaining as it is, into the recording medium 27 as recording data. Further, the data control unit 53 supplies the device control unit 51 with the addition completed total data amount.

Further, the data control unit 53 is configured to, in accordance with control performed by the device control unit 51, read out base data, which is encoded by using an MPEG method supporting the Long-GOP structure. The data control unit 53 removes fillers from the base data and supplies the resultant data to the buffer memory 25. Further, the data control unit 53 recognizes a data amount of fillers included in the read-out base data. The data control unit 53 supplies the device control unit 51 with the predicted usable total data amount.

Figure 21:
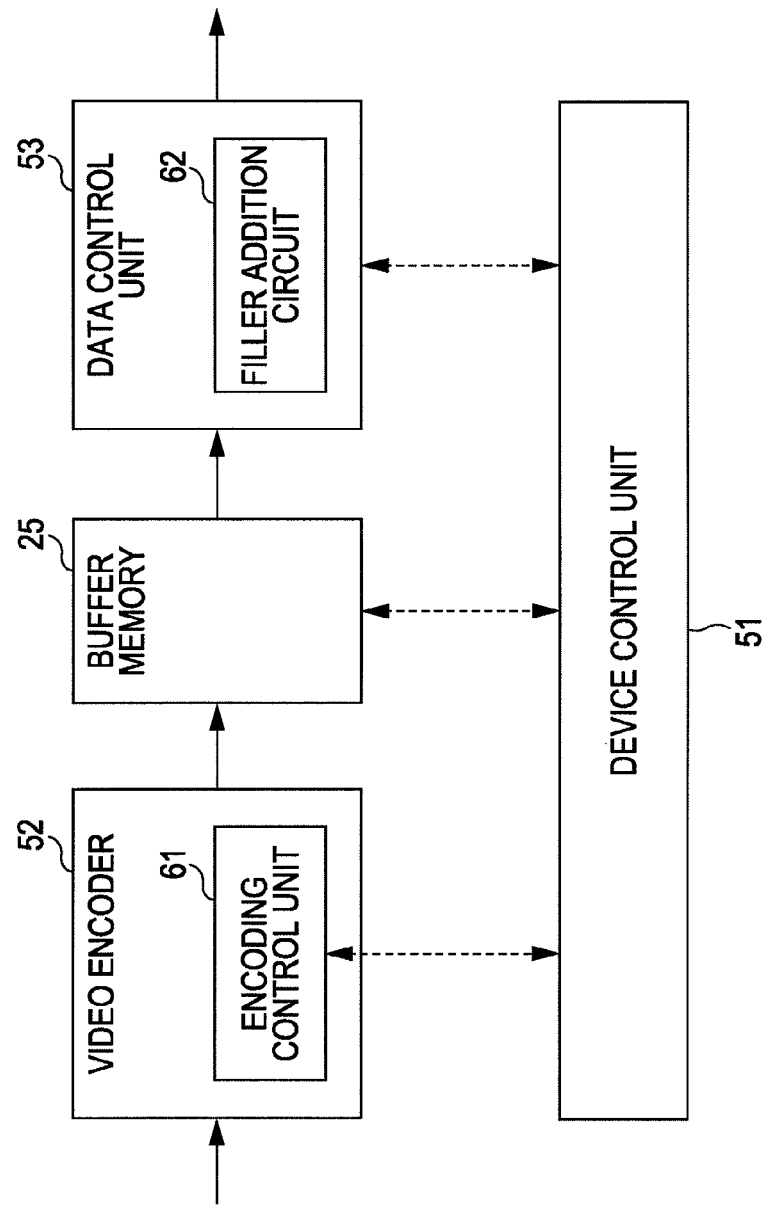
FIG. 21 is a diagram used for detailed explanation of processing performed when performing recording of insertion data, according to a second embodiment of the present invention.

FIG. 21 is a diagram used for detailed explanation of processes of recording insertion data, performed by the video encoder 52, the data control unit 53 and the like.

As shown in FIG. 21, the video encoder 52 is configured to include an encoding control unit 61 (a stuffing data addition unit) for performing control of encoding processing. The encoding control unit 61 monitors a bit occupancy amount in a VBV buffer. Further, the encoding control unit 61 is configured to, on the basis of a value obtained by subtracting an addition completed total data amount from a predicted usable total data amount (the value will be hereinafter called a predicted remaining data amount), set an encoding mode to the align control mode or the normal mode.

The encoding control unit 61 is configured to, under the align control mode, create insertion data by adding stuffing data to a block of encoded overwriting data included in each of relevant pictures so as to make a generated code amount of a block of insertion data included in the corresponding picture be equal to the data amount XAlign. Further, the encoding control unit 61 is configured to, under the normal mode, handle each relevant block of encoded overwriting data, which remains as it is, as the corresponding block of insertion data. The encoding control unit 61 supplies the insertion data to the buffer memory 25.

The data control unit 53 is configured to include a filler addition circuit 62 for adding a filler to a block of insertion data included in each picture. The data control unit 53 is configured to, in accordance with control performed by the device control unit 51, read out base data within a re-encoding range.

The filler addition circuit 62 is configured to, when performing recording of a block of insertion data included in each of relevant pictures, the block of insertion data having a data amount other than the data amount XAlign, add a filler to the block of insertion data so as to make the data amount of the resultant block of data be equal to the data amount XAlign. Further, the filler addition circuit 62 is configured to, when performing recording of a block of insertion data included in each of relevant pictures, the block of insertion data having the data amount XAlign, add a filler having the data amount XAlign to the block of insertion data on the basis of a predicted remaining data amount. The data control unit 53 records blocks of insertion data each having a filler added thereto, or blocks of insertion data each remaining as it is, into the recording medium 27 as the corresponding blocks of recording data.

FIGS. 22A and 22B, FIGS. 23A and 23B, and FIGS. 24A and 24B are pairs of diagrams, each pair illustrating examples of configurations of recording data.

As shown in FIG. 22A, the data control unit 53 is configured to, when an IN point is designated by a user, firstly, recognize a total data amount of fillers included in a predetermined range extending from a start point within a re-encoding range as a predicted usable total data amount. Further, as shown in FIG. 22B, the encoding control unit 61 is configured to, for each picture, on the basis of a predicted remaining data amount obtained by comparing a predicted usable total data amount and an addition completed total data amount, set the normal mode or the align control mode to an encoding mode.

As shown in FIG. 22B, the filler addition circuit 62 is configured to add a filler to a block of insertion data included in each of relevant pictures, the block of insertion data having been obtained under the normal mode, so as to make a data amount of the block of insertion data included in the picture be equal to the data amount XAlign. In contrast, the filler addition circuit 62 is configured to add no filler to a block of insertion data included in each of relevant pictures, the block of insertion data having been obtained under the align control mode, and owing thereto, having the data amount XAlign.

In addition, as shown in FIGS. 23A and 23B, in the case where a predicted remaining data amount newly obtained by subtracting a data amount of a filler having been added in such a manner as described above from a current predicted remaining data amount is relatively small, the filler addition circuit 62 adds a filler to a block of insertion data included in a relevant picture regardless of the encoding mode, the filler having the data amount XAlign, which is smaller than the newly obtained predicted remaining data amount data.

Further, as shown in FIG. 24A, the data control unit 53 is configured to, when an OUT point is designated by a user, recognize a total data amount of fillers included in base data from a start point to an end point within a re-encoding range. Further, the data control unit 53 calculates a value as an absolutely usable total data amount by subtracting a current addition completed total data amount from the recognized total data amount of fillers.

Subsequently, as shown in FIG. 24B, in the case where an absolutely usable total data amount is not so sufficient, the encoding control unit 61 sets an encoding mode of pictures from a picture currently targeted for encoding to a last picture included in overwriting data (the pictures will be hereinafter called as a last group of pictures) to the align control mode. Further, the filler addition control circuit 62 adds a filler having a data amount equal to the absolutely usable total data amount to a last of pictures included in insertion data.

In contrast, as shown in FIG. 24B, in the case where an absolutely usable total data amount is sufficient, the encoding control unit 61 sets an encoding mode of a last group of pictures to the normal mode. Further, the filler addition circuit 62 adds a filler to a block of insertion data included in each of pictures except a last picture within the last group of pictures so as to make a data amount of the block of insertion data having the filler added thereto be equal to the data amount XAlign. Further, the filler addition circuit 62 adds a filler to a block of insertion data included in the last picture, the block of filler having a data amount equal to a value obtained by subtracting a total data amount of fillers which have already been added to pictures except the last picture within the last group of pictures from a current absolutely usable total data amount (the obtained value will be hereinafter called an absolutely remaining data amount).

[Explanation of Processes Performed by a Recording Unit]

Figure 25:
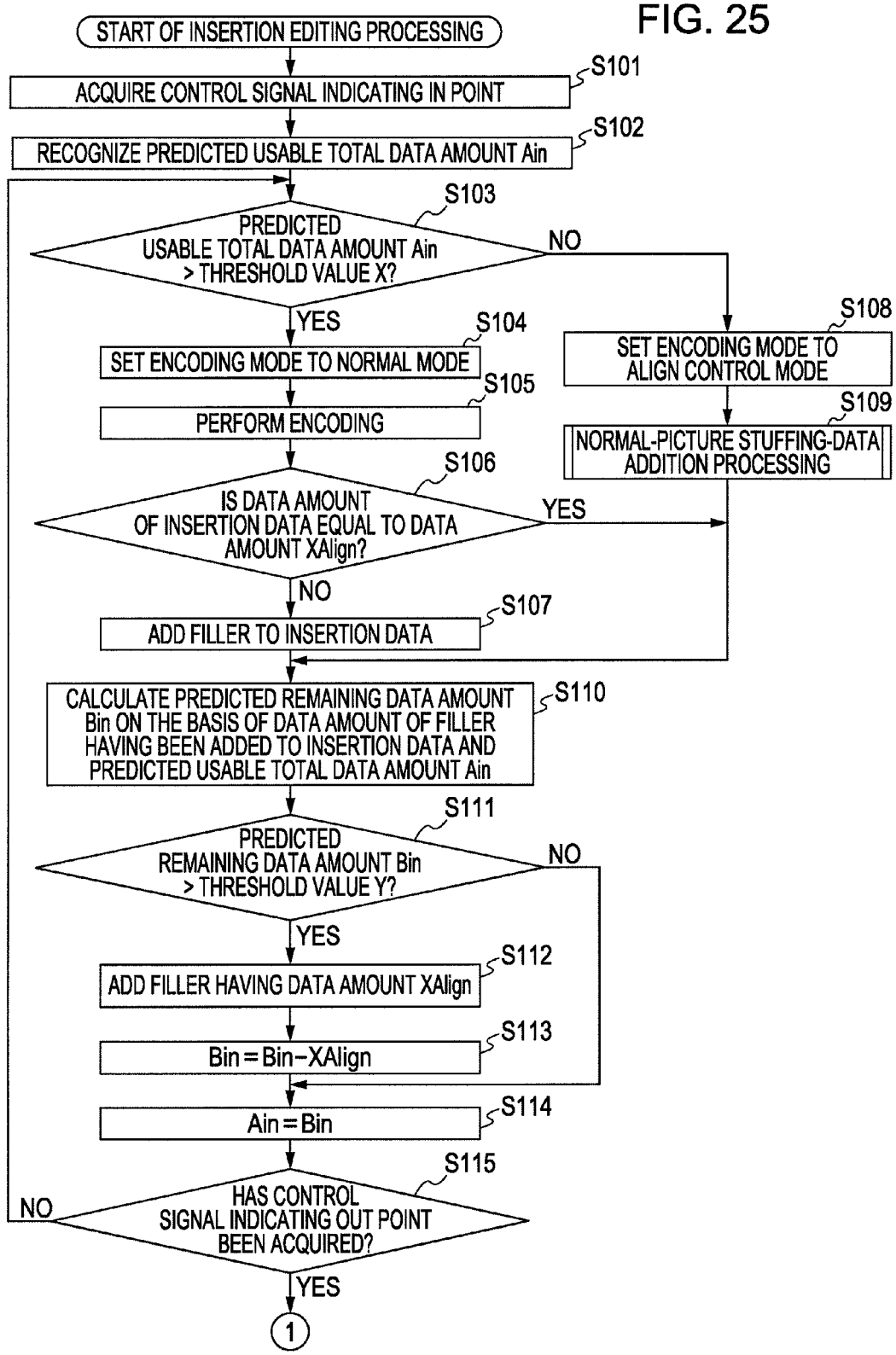
FIG. 25 is a flowchart used for explanation of insertion editing processing according to a second embodiment of the present invention.
Figure 26:
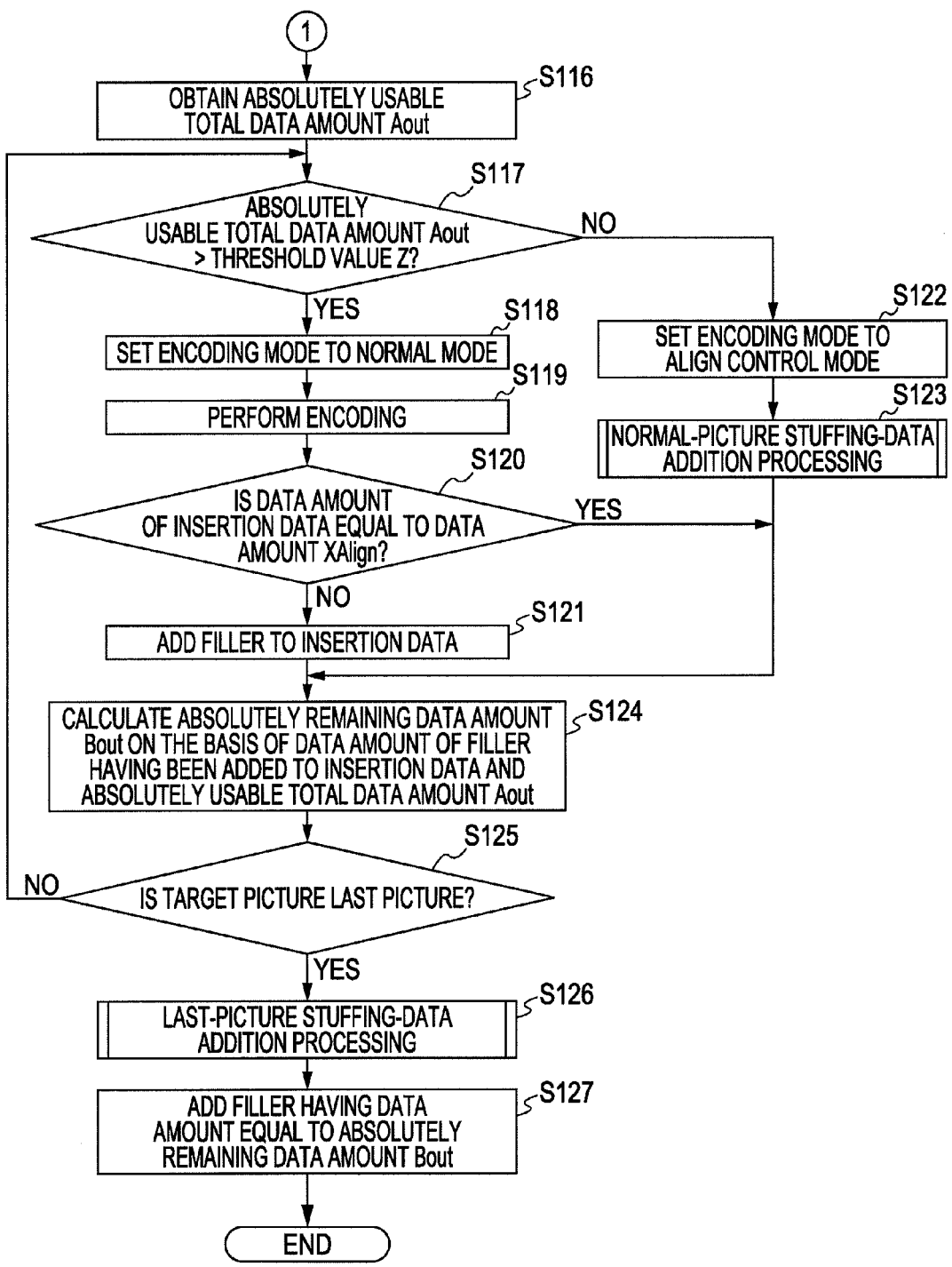
FIG. 26 is a flowchart used for explanation of insertion editing processing according to a second embodiment of the present invention.

FIGS. 25 and 26 are flowcharts used for explanation of insertion processing performed by the recording unit 50. This insertion processing is commenced, for example, when a user designates an IN point by using the editing unit 13.

In step S101, the device control unit 51 acquires a control signal indicating an IN point from the editing unit 13. Further, the device control unit 51 performs control so as to cause the data control unit 53 to commence reading out of base data from the recording medium 27, which is included in pictures within a re-encoding range extending from a start point, i.e., an initial picture of a GOP including the IN point.

In step S102, the data control unit 53 recognizes a total data amount of fillers contained in the read-out base data included in a predetermined range (for example, a range including 30 pictures therein) within the re-encoding range extending from the start point as a predicted usable total data amount Ain. The data control unit 53 supplies the predicted usable total data amount Ain to the video encoder 52 via the device control unit 51.

In step S103, the video encoder 52 determines whether the predicted usable total data amount Ain is larger than a preset threshold value X (for example, 30 Kbytes), or not. If it is determined in step S103 that the predicted usable total data amount Ain is larger than the preset threshold value X, in step S104, the video encoder 52 sets an encoding mode to the normal mode.

In step S105, the video encoder 52 regards the start point within the re-encoding range as a target picture for processing, and encodes a block of overwriting data included in the target picture, which is supplied from the baseband input/output processing unit 22. The video encoder 52 regards the block of encoded overwriting data included in the target picture as a block of insertion data, and supplies the buffer memory 25 with the block of insertion data to causes the buffer memory 25 to retain it temporarily.

In step S106, the data control unit 53 reads out a block of insertion data included in the target picture from the buffer memory 25, and determines whether a data amount of the block of insertion data is equal to the data amount XAlign, or not.

If it is determined in step S106 that a data amount of the block of insertion data is not equal to the data amount XAlign, in step S107, the data control unit 53 adds a filler to the block of insertion data so as to make a data amount of the resultant block of insertion data having the filler added thereto be equal to the data amount XAlign. Further, the process flow proceeds to step S110.

In contrast, if it is determined in step S106 that the data amount of the block of insertion data is equal to the data amount XAlign, processing performed in step S107 is skipped, and the process flow proceeds to step S110.

Further, if it is determined in step S103 that the predicted usable total data amount Ain is smaller than or equal to the threshold value X, in step S108, the video encoder 52 sets the encoding mode to the align control mode.

In step S109, the data control unit 53 performs normal-picture stuffing-data addition processing, such as shown in FIG. 14, and causes the process flow to proceed to step S110.

In step S110, the data control unit 53 calculates a predicted remaining data amount Bin on the basis of a data amount of a filler having been added to the block of insertion data and the predicted usable total data amount Ain. In addition, in the case where, immediately previously, it was determined in step S106 that the data amount of the block of insertion data is equal to the data amount XAlign, or the normal-picture stuffing data addition processing was performed in step S109, the data amount of a filler having been added to the block of insertion data is "0".

In step S111, the data control unit 53 determines whether the predicted remaining data amount Bin is larger than a preset threshold value Y, or not. If it is determined in step S111 that the predicted remaining data amount Bin is larger than the preset threshold value Y, in step S112, the data control unit 53 adds a filler having the data amount XAlign, which is smaller than the predicted remaining data amount Bin, to the block of insertion data.

In step S113, the data control unit 53 obtains a value as a new predicted remaining data amount by subtracting the data amount XAlign for the filler, which was added to the block of insertion data in step S111, from the predicted remaining data amount Bin, and causes the process flow to proceed to step S114.

In contrast, if it is determined in step S111 that the predicted remaining data amount Bin is not larger than the threshold value Y, the processes performed in steps S112 and S113 are skipped, and the process flow proceeds to step S114.

In step S114, the data control unit 53 replaces the predicted usable total data amount Ain by the predicted remaining data amount Bin. In step S115, the device control unit 51 determines whether a control signal indicating an OUT point has already been acquired from the editing unit 13, or not.

If it is determined in step S115 that the control signal indicating an OUT point has not yet been acquired, the video encoder 52 replaces the current target picture by a picture subsequent to the current target picture, and causes the process flow to return to step S103. Further, the processes in steps S103 to S115 are repeated until acquisition of the control signal indicating an OUT point.

In contrast, if it is determined in step S115 that the control signal indicating an OUT point has already been acquired, the device control unit 51 determines the end point of the re-encoding range. Further, in step S116, the data control unit 53 calculates an absolutely usable total data amount Aout by subtracting an addition completed total data amount for pictures up to the current picture from a total data amount of fillers included in base data within the re-encoding range. Further, the data control unit 53 supplies the calculated absolutely usable total data amount Aout to the video encoder 52 via the device control unit 51.

In step S117, the video encoder 52 determines whether the absolutely usable total data amount Aout supplied from the device control unit 51 is larger than a preset threshold value Z, or not. If it is determined in step S117 that the absolutely usable total data amount Aout is larger than the preset threshold value Z, in step S118, the video encoder 52 sets the encoding mode to the normal mode.

In step S119, the video encoder 52 replaces the current target picture by a picture subsequent to the current target picture, and encodes a block of overwriting data included in the target picture, which is supplied from the baseband input/output processing unit 22. Further, the video encoder 52 supplies the buffer memory 25 with the block of encoded overwriting data included in the target picture as a block of insertion data to cause the buffer memory 25 to retain it temporarily.

In step S120, the data control unit 53 reads out the block of insertion data included in the target picture from the buffer 25, and determines whether a data amount of the block of insertion data is equal to the data amount XAlign, or not.

If it is determined in step S120 that the data amount of the block of insertion data is not equal to the data amount XAlign, in step S121, the data control unit 53 adds a filler to the block of insertion data included in the target picture so as to make a data amount of the block of insertion data having the filler added thereto be equal to the data amount XAlign. Further, the process flow proceeds to step S124.

In contrast, it is determined in step S120 that the data amount of the block of insertion data is equal to the data amount XAlign, the process performed in step S121 is skipped, and the process flow proceeds to step S124.

Further, if it is determined in step S117 that the absolutely usable total data amount Aout is smaller than or equal to the threshold value Z, in step S122, the video encoder 52 sets the encoding mode to the align control mode.

In step S123, the video encoder 52 performs the normal-picture stuffing-data addition processing, such as shown in FIG. 14, and causes the process flow to proceed to step S124.

In step S124, the data control unit 53 calculates an absolutely remaining data amount Bout on the basis of a data amount of the filler having been added to the block of insertion data included in the target picture and the absolutely usable total data amount Aout. In addition, in the case where, immediately previously, it was determined in step S120 that the data amount of the block of insertion data included in the target picture is equal to the data amount XAlign, or the normal-picture stuffing data addition processing was performed in step S123, the data amount of a filler having been added to the block of insertion data is "0".

In step S125, it is determined whether the current target picture is a last picture, or not. If it is determined in step S125 that the current target picture is not a last picture, the process flow returns to step S117, and the processes in steps 117 to 125 are repeated until the current target picture becomes a last picture.

If it is determined in step S125 that the current target picture is a last picture, in step S126, the video encoder 52 performs the last-picture stuffing data addition processing, such as shown in FIG. 15.

In step S127, the data control unit 53 adds a filer having the absolutely remaining data amount Bout to the block of insertion data included in the current target picture, that is, the last picture, and terminates the process flow.

In addition, in the above-described insertion processing, assuming that a bit occupancy amount in a VBV buffer at a connection point after completion of editing processing is likely to be larger than or equal to a bit occupancy amount in a VBV buffer at the connection point before commencement of the editing processing, the process flow subsequent to completion of the process performed in step S126 is caused to proceed to step S127. In this case, if a bit occupancy amount in a VBV buffer at the connection point after completion of editing processing is unlikely to be larger than or equal to a bit occupancy amount in a VBV buffer at the connection point before commencement of the editing processing, the data control unit 53 sets an end point of the re-encoding range once again, and causes the process flow to return to step S116.

Further, in the above-described insertion processing, a filler having a total data amount equal to a total data amount of fillers included in base data is added to insertion data separately for each filler having the data amount XAlign; however, the filler may be added to a block of insertion data included in the last picture in a bundled manner.

As described above, the recording unit 50 predicts a total data amount of fillers included in base data within a predetermined range extending from a start point of a re-encoding range as a usable data amount for fillers to be allocated in insertion data. Further, depending on a determination as to whether a value obtained by subtracting a data amount of fillers which have already been added to insertion data from the usable data amount for fillers to be allocated in insertion data is sufficient, or not, the recording unit 50 sets an encoding mode. Therefore, compared with a method, in which a block of insertion data having the data amount XAlign is created for each picture having overwriting data therein, in the above-described method, a total data amount of stuffing data can be reduced to a greater degree. Consequently, it is possible to increase quality of images obtained after completion of insertion editing.

In addition, the above-described embodiments according to the present invention can be applied to editing systems, in each of which insertion editing is performed by inserting variable-length encoded overwriting data within a predetermined range on a transport stream (TS) transmitted from a certain external device. In this case, the above-described filler corresponds to an adaptation field.

Further, the above-described embodiments according to the present invention can be applied to editing systems, in each of which editing of data encoded by using methods conforming to standards, such as ISO/IEC 13838-2, ITU-T H.262, ISO/IEC 14496-19 and ITU-T H.264, is performed.

A series of processes performed by a recording unit, having been described above, can be executed by using hardware or software. In the case where the series of processes is executed by using pieces of software, a program configured to include the pieces of software is installed in a computer. Here, in the scope of such a computer, computers each being incorporated in dedicated hardware, and computers each being capable of executing various kinds of functions by installing various kinds of programs therein, such as a general-purpose personal computer, are included.

Figure 27:
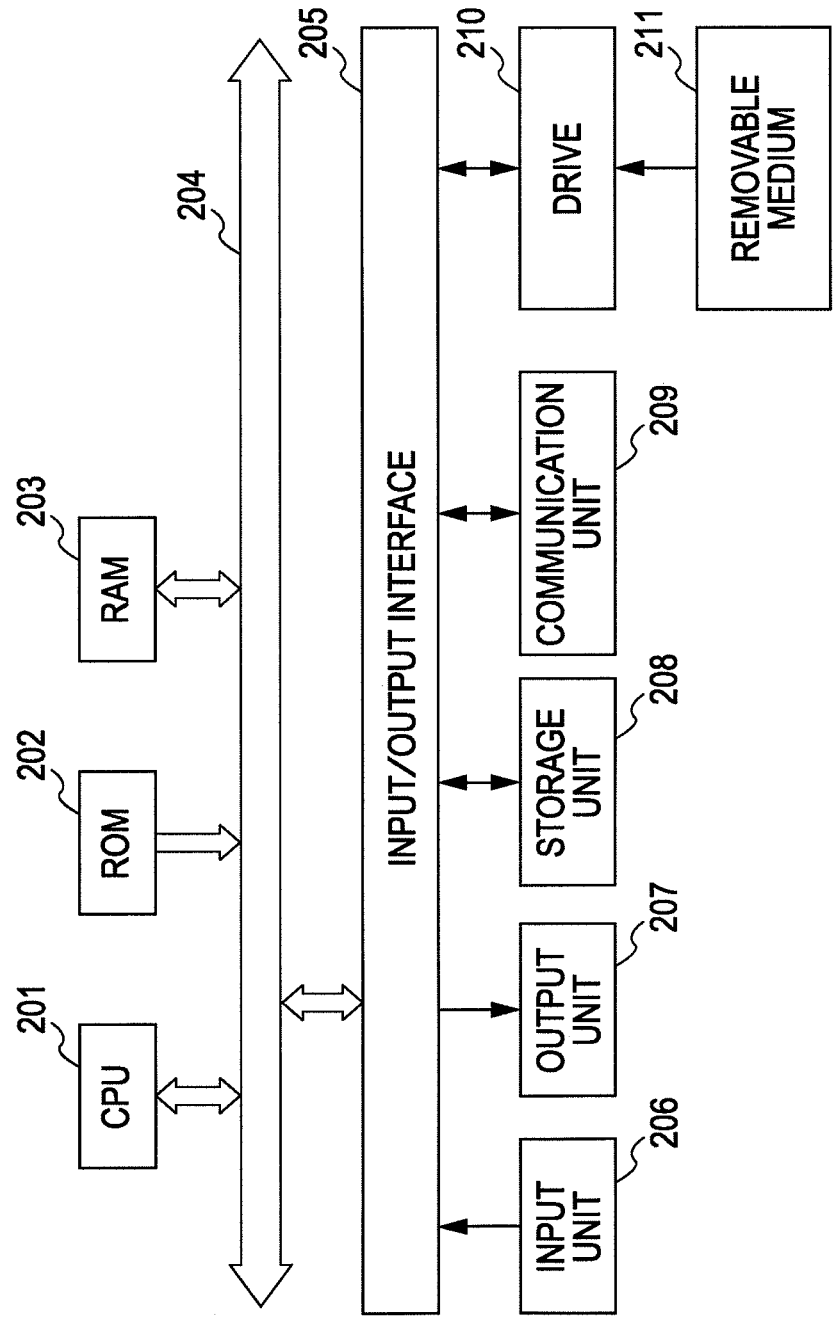
FIG. 27 is a block diagram illustrating an example of a hardware configuration of a computer according to a first embodiment and a second embodiment of the present invention.

FIG. 27 is a block diagram illustrating an example of a hardware configuration of a computer which allows programs installed therein to execute the above-described series of processes performed by a recording unit.

In the computer, a central processing unit (CPU) 201, a read only memory (ROM) 202 and a random access memory (RAM) 203 are connected to one another via a bus 204.

To the bus 204, further, an input/output interface 25 is connected. To the input/output interface 25, an input unit 206, an output unit 207, a storage unit 208, a communication unit 209 and a drive 210 are connected.

The input unit 206 is configured to include a keyboard, a mouse, a microphone and the like. The output unit 207 is configured to include a display, a speaker and the like. The storage unit 208 is configured to include a hard disk, a nonvolatile memory and the like. The communication unit 209 is configured to include a network interface and the like. The drive 210 is configured to drive a removal medium 211, such as a magnetic disk, an optical disk, an magneto optical disk or a semiconductor memory.

In a computer configured as described above, the above-described series of processes is performed by causing the CPU 201 to, for example, load programs stored in the storage unit 208 to the RAM 203 via the input/output interface 205 and the bus 204, and execute the programs.

The programs executed by the computer (the CPU 201) can be provided, for example, by allowing the removable medium 211 to function as a package medium and the like capable of storing the programs therein. Further, the programs can be provided via a wired or wireless transmission medium, such as a local area network, the internet or a digital satellite broadcasting.

In the computer, it is possible to install the programs into the storage unit 208 via the input/output interface 205 by loading the drive 210 with the removal medium 211. Further, it is possible for the communication unit 209 to receive programs via the wired or wireless transmission medium, and install the programs into the storage unit 208. Besides the above-described methods, there is a method which allows the programs to be installed in the ROM 202 or the storage medium 208 in advance.

In addition, in this specification document, steps for describing programs recorded on each of the above-described program storage media are configured to, as a matter of course, include processes which are executed in time series in accordance with a described sequence order, and further, include processes which are not necessarily executed in time series but are executed in parallel or individually.

Moreover, in this specification document, the term "system" indicates a totality of apparatuses constituted by a plurality of apparatuses.

The present application contains subject matter related to that disclosed in Japanese Priority Patent Application JP 2009-172459 filed in the Japan Patent Office on Jul. 23, 2009, the entire content of which is hereby incorporated by reference.

It should be understood that embodiments according to the present invention are not limited to the above-described embodiments, but within the scope not departing from the gist of the present invention, various modifications can be made thereon.

What is claimed is:

1. An editing apparatus, comprising:
encoding means configured to perform variable-length encoding of overwriting data to be used for insertion editing on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;
stuffing data addition means configured to sequentially obtain each picture included in the overwriting data having been variable-length encoded as a target picture,
wherein if a data amount of the overwriting data included in each picture is not equal to the integral multiple of a predetermined unit, the stuffing data addition means creates insertion data included in each picture by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the stuffing data addition means handles the overwriting data included in each picture, which remains as it is, as insertion data included in each picture;
filler addition means configured to add a filler having a data amount the same as a data amount of a filler included in the base data to the insertion data having a total data amount the same as a data amount of the real data; and
insertion means configured to insert insertion data, to which the filler is added, onto the base data,
wherein the filler addition means reads out a predetermined range of the base data, removes the filler data from the predetermined range of the base data, recognizes the amount of filler data included in the predetermined range of the base data, adds said filler to a portion of the base data for the insertion data included in a last picture and supplies the resultant base data to a buffer memory.

2. The editing apparatus according to claim 1, wherein the filler addition means is configured to add the filler to the insertion data included in a last picture.

3. The editing apparatus according to claim 1, wherein:
if a predicted remaining data amount represented by a subtraction value between an addition-completed total data amount and a predicted usable total data amount is larger than or equal to a predetermined threshold value, the filler addition means is configured to add a filler having a first data amount equal to an integral multiple of a predetermined unit, the first data amount being smaller than or equal to the subtraction value, to the insertion data included in the target picture, and
if the target picture is a last picture, the filler addition means is configured to add a filler having a second data amount equal to the subtraction value to the insertion data included in the target picture.

4. The editing apparatus according to claim 1,
wherein, if a predicted remaining data amount represented by a subtraction value between an addition-completed total data amount and a predicted usable total data amount is larger than or equal to a predetermined threshold value, the stuffing data addition means is configured to handle the overwriting data included in the picture, which remains as it, as insertion data included in the target picture, and
wherein, if the subtraction value is smaller than or equal to the predetermined threshold value:
in the case where a data amount of the overwriting data included in the target picture is not equal to an integral multiple of a predetermined unit, the stuffing data addition means is configured to create the insertion data included in the target picture by adding stuffing data to the overwriting data included in the target picture so that the data amount of the overwriting data included in the target picture can be equal to an integral multiple of a predetermined unit, and
in the case where the data amount of the overwriting data included in the target picture is equal to an integral multiple of a predetermined unit, the stuffing data addition means is configured to handle the overwriting data included in the target picture, which remains as it is, as insertion data included in the target picture, and
wherein the filler addition means is configured to, if a data amount of the insertion data included in the target picture is not equal to an integral multiple of a predetermined unit, add a filler to the insertion data included in the target picture so that the data amount of the insertion data included in the target picture can be equal to an integral multiple of a predetermined unit, and further, add a filler to the insertion data so that a data amount of the filler included in the base data and a data amount of the filler added to the insertion data can be the same.

5. The editing apparatus according to claim 4, wherein the filler addition means is configured to add a filler to the insertion data included in a last picture so that a data amount of the filler included in the base data and a data amount of the filler added to the insertion data can be the same.

6. The editing apparatus according to claim 4, wherein:
if the subtraction value is larger than the predetermined threshold value, the filler addition means is configured to add a filler having a first data amount equal to an integral multiple of a predetermined unit smaller than the subtraction value to the insertion data included in the target picture so that a data amount of the filler included in the base data and a data amount of the filler added to the insertion data can be the same, and
if the target picture is a last picture, the filler addition means is configured to add a filler having a second data amount equal to the subtraction; value to the insertion data included in the target picture.

7. An editing method used in an editing apparatus, the editing method comprising the steps of:

performing variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

adding stuffing data so that each picture included in the overwriting data having been variable-length encoded is sequentially obtained as a target picture, wherein if a data amount of the overwriting data included in each picture is not equal to the integral multiple of a predetermined unit, insertion data included in each picture is created by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the overwriting data included in each picture, which remains as it is, is handled as insertion data included in each picture;

adding a filler having a data amount the same as a data amount of a filler included in the base data to the insertion data having a total data amount the same as a data amount of the real data; and inserting insertion data, to which the filler is added, onto the base data, wherein the filler adding step reads out a predetermined range of the base data, removes the filler data from the predetermined range of the base data, recognizes the amount of filler data included in the predetermined range of the base data, adds said filler to a portion of the base data for the insertion data included in a last picture and supplies the resultant base data to a buffer memory.

8. A non-transitory computer-readable medium storing a program causing a computer to execute processing comprising the steps of:

performing variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

adding stuffing data so that each picture included in the overwriting data having been variable-length encoded is sequentially obtained as a target picture, wherein if a data amount of the overwriting data included in each picture is not equal to integral multiple of a predetermined unit, insertion data included in each picture is created by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the overwriting data included in each picture, which remains as it is, is handled as insertion data included in each picture;

adding a filler having a data amount the same as a data amount of a filler included in the base data to the insertion data having a total data amount the same as a data amount of the real data; and inserting insertion data, to which the filler is added, onto the base data, wherein the filler adding step reads out a predetermined range of the base data, removes the filler data from the predetermined range of the base data, recognizes the amount of filler data included in the predetermined range of the base data, adds said filler to a portion of the base data for the insertion data included in a last picture and supplies the resultant base data to a buffer memory.

9. An editing apparatus, comprising:

encoding means configured to perform variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

stuffing data addition means configured to sequentially obtain each picture included in the overwriting data having been variable-length encoded as a target picture, a data control unit that reads out a predetermined range of the base data, removes the filler data from the predetermined range of the base data, recognizes the amount of filler data included in the predetermined range of the base data, adds said filler to a portion of the base data for insertion data included in a last picture and supplies the resultant base data to a buffer memory;

wherein if a data amount of the overwriting data included in each picture is not equal to the integral multiple of a predetermined unit, the stuffing data addition means creates insertion data included in each picture by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the stuffing data addition means handles the overwriting data included in each picture, which remains as it is, as insertion data included in each picture; and insertion means configured to insert the insertion data having a total data amount the same as a data amount of the base data onto the base data.

10. An editing method used in an editing apparatus, the editing method comprising the steps of:

performing variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

adding stuffing data so that each picture included in the overwriting data having been variable-length encoded is sequentially obtained as a target picture, reading out a predetermined range of the base data, removing the filler data from the predetermined range of the base data, recognizing the amount of filler data included in the predetermined range of the base data, adding said filler to a portion of the base data for insertion data included in a last picture and supplying the resultant base data to a buffer memory;

wherein if a data amount of the overwriting data included in each picture is not equal to the integral multiple of a predetermined unit, insertion data included in each picture is created by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the overwriting data included in each picture, which remains as it is, is handled as insertion data included in each picture; and inserting the insertion data having a total data amount the same as a data amount of the base data onto the base data.

11. A non-transitory computer-readable medium storing a program causing a computer to execute processing comprising the steps of:

performing variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

adding stuffing data so that each picture included in the overwriting data having been variable-length encoded is sequentially obtained as a target picture, reading out a predetermined range of the base data, removing the filler data from the predetermined range of the base data, recognizing the amount of filler data included in the predetermined range of the base data, adding said filler to a portion of the base data for insertion data included in a last picture and supplying the resultant base data to a buffer memory.

wherein if a data amount of the overwriting data included in each picture is not equal to the integral multiple of a predetermined unit, insertion data included in each picture is created by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the overwriting data included in each picture, which remains as it is, is handled as insertion data included in each picture; and inserting the insertion data having a total data amount the same as a data amount of the base data onto the base data.

12. An editing apparatus, comprising:

an encoding section configured to perform variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

a stuffing data addition section configured to sequentially obtain each picture included in the overwriting data having been variable-length encoded as a target picture, wherein if a data amount of the overwriting data included in each picture is not equal to the integral multiple of a predetermined unit, the stuffing data addition section creates insertion data included in each picture by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the stuffing data addition section handles the overwriting data included in each picture, which remains as it is, as insertion data included in each picture;

a filler addition section configured to add a filler having a data amount the same as a data amount of a filler included in the base data to the insertion data having a total data amount the same as a data amount of the real data; and an insertion section configured to insert insertion data, to which the filler is added, onto the base data, wherein the filler addition section reads out a predetermined range of the base data, removes the filler data from the predetermined range of the base data, recognizes the amount of filler data included in the predetermined range of the base data, adds said filler to a portion of the base data for the insertion data included in a last picture and supplies the resultant base data to a buffer memory.

13. An editing apparatus, comprising:

an encoding section configured to perform variable-length encoding of overwriting data used for insertion editing performed on base data, wherein the base data is segmented into a plurality of pictures, each including variable-length encoded real data and having a data amount equal to an integral multiple of a predetermined unit, which results from multiplying the predetermined unit by an arbitrary integer greater than or equal to 1;

a stuffing data addition section configured to sequentially obtain each picture included in the overwriting data having been variable-length encoded as a target picture, a data controlling section that reads out a predetermined range of the base data, removes filler data from the predetermined range of the base data, recognizes the amount of filler data included in the predetermined range of the base data, adds said filler to a portion of the base data for insertion data included in a last picture and supplies the resultant base data to a buffer memory.

wherein if a data amount of the overwriting data included in each picture is not equal to the integral multiple of a predetermined unit, the stuffing data addition section creates insertion data included in each picture by adding stuffing data to the overwriting data included in each picture so that the data amount of the overwriting data included in each picture can be equal to the integral multiple of a predetermined unit, and if the data amount of the overwriting data included in each picture is equal to the integral multiple of a predetermined unit, the stuffing data addition section handles the overwriting data included in each picture, which remains as it is, as insertion data included in each picture; and an insertion section configured to insert the insertion data having a total data amount the same as a data amount of the base data onto the base data.

* * * * *